(12) United States Patent
Watanabe

(10) Patent No.: US 6,466,390 B1
(45) Date of Patent: Oct. 15, 2002

(54) RECORDING AND/OR REPRODUCING DEVICE FOR MAGNETIC TAPE

(75) Inventor: Hiromu Watanabe, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/518,083

(22) Filed: Mar. 10, 2000

Related U.S. Application Data

(62) Division of application No. 09/142,254, filed as application No. PCT/JP98/00373 on Jan. 29, 1998, now Pat. No. 6,147,833.

(30) Foreign Application Priority Data

| Jan. 29, 1997 | (JP) | ............................................. 9-015633 |
| Jan. 31, 1997 | (JP) | ............................................. 9-019092 |
| Jan. 31, 1997 | (JP) | ............................................. 9-019093 |

(51) Int. Cl.$^7$ ............................................. G11B 15/48
(52) U.S. Cl. ..................................... 360/74.1; 360/74.2
(58) Field of Search ............................... 360/74.1, 74.2, 360/73.09, 74.3; 242/203, 186, 187; 318/6, 245–290

(56) References Cited

U.S. PATENT DOCUMENTS 4,553,182 A * 11/1985 Narita .................... 360/74.2 X
4,963,999 A * 10/1990 Utsunomiya et al. ...... 360/72.3
5,045,957 A * 9/1991 Doutsubo .................... 360/71
5,781,359 A * 7/1998 Otsuki et al. ................. 360/71

* cited by examiner

Primary Examiner—David Hudspeth
Assistant Examiner—K Wong
(74) Attorney, Agent, or Firm—Jay H. Maioli

(57) ABSTRACT

A recording and/or reproducing apparatus for a magnetic tape includes a supply side reel gear a takeup side reel gear, a tape guide drum about which the magnetic tape pulled out from a tape cassette is wound, a tape loading mechanism for pulling out the magnetic tape from the tape cassette and for placing it on the tape guide drum by way of tape loading and for housing it in the tape cassette by way of tape unloading, and a switching mechanism for switching the running direction of the magnetic tape pulled out from the tape cassette. This switching mechanism includes a counter gear positioned between the supply side reel gear and the takeup side reel gear during loading of the magnetic tape by the tape loading mechanism, and controls the running direction of the magnetic tape by the counter gear selectively meshing with the supply side reel gear or the takeup side reel gear after completion of the loading of the magnetic tape. Since the running direction of the magnetic tape is controlled by switching of the counter gear, the running direction of the magnetic tape can be switched promptly.

2 Claims, 18 Drawing Sheets

RECORDING AND/OR REPRODUCING DEVICE FOR MAGNETIC TAPE

This is a division of prior application Ser. No. 09/142,254 filed Feb. 9, 1999, now U.S. Pat. No. 6,147,832 which is a 371 of PCT/JP98/00373 filed on Jan. 29, 1998.

TECHNICAL FIELD

This invention relates to a recording and/or reproducing apparatus employing a magnetic tape as a recording medium. More particularly, it relates to a recording and/or reproducing apparatus having a tape loading mechanism for pulling out a magnetic tape housed in a tape cassette loaded on a cassette loading mechanism within a main body unit of the apparatus by a tape loading mechanism for loading the tape on a pre-set tape running route.

BACKGROUND ART

A recording and/or reproducing apparatus employing a tape cassette housing a magnetic tape as a recording medium is currently in use. As this sort of the recording and/or reproducing apparatus, there is known an audio PCM tape recorder or a video tape recorder having a rotary magnetic head device which is comprised of a rotary magnetic head having sliding contact with the magnetic tape pulled out of the tape cassette, or a tape guide drive.

In this recording and/or reproducing apparatus, information signals are recorded and/or reproduced for a magnetic tape by causing the rotary magnetic head to have a sliding contact with the magnetic tape run from or to a tape guide drum.

The recording and/or reproducing apparatus having the rotary magnetic head device is provided with a tape loading mechanism for pulling out the magnetic tape housed in the tape cassette for being taken up on a tape guide drum after running on a pre-set tape running path in the main body unit of the apparatus. The tape loading mechanism has a movement guide block which is moved between the tape cassette loading mechanism and the rotary magnetic head device. This movement guide block has a guide roll about which the magnetic tape i.s hooked so as to be pulled out of the tape cassette and so as to be automatically loaded on the tape running route. The magnetic tape wound about the tape guide drum is run at a constant velocity as it is clinched between a capstan arbor run in rotation by a capstan motor and a pinch roll.

Meanwhile, in a recording and/or reproducing apparatus, such as an audio PCM tape recorder having a rotary magnetic head device, there are occasions wherein the magnetic tape is run in a direction reversed for the forward direction for recording and/or reproducing information signals for the magnetic tape as when retrieving the signals recorded on the magnetic tape or re-writing sub-codes.

For doing these operations, this sort of the tape recorder includes a mechanism for selectively driving supply side or take-up side reel shafts depending on the tape running direction. The mechanism for switching between the reel shafts to be in operation depending on the tape running direction is adapted for transmitting the driving force of the reel shaft driving motor to one of the reel shafts, and is provided independently of the capstan motor adapted for running the magnetic tape at a constant velocity.

With the recording and/or reproducing apparatus having the capstan motor for running the magnetic tape at a constant velocity and the driving motor for driving the reel shaft, the capstan motor and the reel shaft driving motor can be controlled independently of each other, and hence the magnetic tape can be taken up simultaneously with switching of the running direction of the magnetic tape, thus assuring prompt switching of the tape running direction.

With this sort of the recording and/or reproducing apparatus, the following inconvenience arises when accommodating the magnetic tape pulled out on the tape running route in the tape cassette by way of unloading for taking out the tape cassette from the cassette loading unit in the main body unit of the apparatus.

For loading the magnetic tape on a pre-set tape running route, the magnetic tape is pulled out of the tape cassette. It is therefore necessary for the driving force transmitting gear transmitting the driving force of the reel shaft driving motor to the supply side reel shaft not to mesh with the supply side reel shaft. For unloading the magnetic tape, it is necessary for the driving power transmitting gear to be engaged with the supply side reel shaft.

Since the driving power transmitting gear is engaged with the reel shaft when the tape cassette is ejected from the cassette loading unit in the main body unit, it is necessary to separate the driving power transmitting gear meshing with the supply side reel shaft from the reel shaft when loading the tape cassette on the cassette loading unit for loading the magnetic tape on the pre-set tape running route. With this sort of the recording and/or reproducing apparatus, such a mechanism is required which is adapted for spacing the driving power transmitting gear from the reel shaft for loading the magnetic tape from the unloaded state, thus complicating the structure of the tape loading mechanism.

Moreover, if a large amount of the magnetic tape is wound on a tape reel, the winding diameter is increased, thus raising the tape take-up speed. Conversely, if a small amount of the magnetic tape is wound on a tape reel, the winding diameter is decreased, thus lowering the tape take-up speed. Thus, it may be feared that, depending on the winding state of the magnetic tape on the tape reel, the speed with which the magnetic tape is taken up on the tape reel becomes faster than the speed with which the movable guide block constituting the tape loading mechanism of the magnetic recording and/or reproducing apparatus is moved from the loading position laterally of the rotary magnetic head device to the tape cassette loading position, thus possibly imposing tension larger than is necessary on the magnetic tape to destruct the tape.

On the other hand, the recording and/or reproducing apparatus, employing the tape cassette as a recording medium and which is provided with a rotary magnetic head device, includes a tape cassette transfer member or a cassette holder supported for movement across the tape cassette loading/unloading position and the tape cassette loading position. The tape cassette is moved via the tape cassette transfer member or the cassette holder to the tape cassette loading position so as to be loaded on the cassette loading unit of the main body portion of the recording and/or reproducing apparatus.

The magnetic tape pulled out of the tape cassette is wound about the tape guide drum a pre-set angular extent to achieve sliding contact with the rotary magnetic head. Thus, the running route of the magnetic tape is of a complex shape, being of a substantially M- or U-shape about the rotary magnetic head as center. The recording and/or reproducing apparatus has the above-mentioned tape loading mechanism for loading the magnetic tape on this complex tape running route.

Meanwhile, in a recording and/or reproducing apparatus, reduced to a portable size, the apparatus in its entirety is small-sized, so that component parts of the tape loading mechanism are spaced apart from one another an extremely small distance, that is, these component parts are proximate to one another. Thus, the movable guide block, constituting the tape loading mechanism, is located extremely close to the rotary magnetic head device when the guide block is moved to close to the magnetic head device. Also, the movable guide block is mechanically supported by a supporting arm supporting it, so that, by the supporting arm making its rotation, the movable guide block is moved between the tape cassette loading position and the rotary magnetic head position. Since the movable guide block is mechanically supported as described above, it has some allowance, so that, if it is moved to close to the rotary magnetic head device, the risk is high that the guide block is tilted towards and occasionally contacted with the rotary magnetic head.

If the magnetic tape recording and/or reproducing apparatus, having the above-mentioned rotary magnetic head device, is in the recording/reproducing mode of recording/reproducing information signals, the pinch rolls are pressed against a capstan, and hence the magnetic tape is clinched therebetween and run at a constant velocity. If the apparatus is in the fast-feed mode, the pinch roll is spaced apart from the capstan, while the supply side reel, operating as the tape supply side, is set so as to be rotatable freely. The take-up side reel is rotated at a high velocity by a reel driving motor for running the magnetic tape at an elevated speed in order to take up the tape on the take-up side reel. If the apparatus is in the rewind mode, that is in a mode of rewinding the magnetic tape once taken up on the take-up roll, the pinch roll is spaced apart from the capstan, while the take-up side reel, operating as the tape supply side, is set so as to be rotatable freely. The supply side reel is rotated at a high velocity by the reel driving motor for running the magnetic tape at an elevated speed in order to rewind the tape on the supply side reel.

Meanwhile, if, in the recording/reproducing apparatus having the conventional rotary magnetic head device, the running of the magnetic tape is to be halted during fast feed or rewind operations, the driving current to the reel driving motor is turned off, at the same time as a braking unit, such as a braking pad, is applied against a portion of a mechanism for transmitting the driving power of the driving motor to the reel, in order to prevent the take-up side reel or the supply side reel from being rotated by the force of inertia of the driving motor notwithstanding the interruption of the driving current.

There is also such a recording/reproducing apparatus in which, instead of providing a forced braking mechanism, such as brake pad, the braking current opposite in direction to that of the driving current during the fast feed mode or rewind mode is supplied to the reel driving motor for applying an abrupt braking action to the reel driving motor.

If a large amount of the magnetic tape is wound on the tape reel set to a rotatable state, the tape reel keeps on to be rotated by its force of inertia to reel out the magnetic tape, no mater whether the rotation of the reel driving motor is halted by the above-mentioned braking mechanism or by the control current. The result is that the magnetic tape is slacked on cessation of the fast feed or rewind operations.

In the magnetic tape recording and/or reproducing apparatus adapted for halting rotation of the reel driving motor by the control current, it may be contemplated to decrease the control current gradually to prevent the magnetic tape from being slacked, that is to lower the voltage of the braking current applied to the coil of the reel driving motor, for gradually braking the reel driving motor. However, with the reel driving motor, the braking applied to the driving motor is strong so that the magnetic tape cannot be prevented from becoming slacked even if the voltage of the braking current is lowered gradually.

DISCLOSURE OF THE INVENTION

It is therefore an object of the present invention to provide a novel recording and/or reproducing apparatus for a magnetic tape whereby the above-mentioned problems inherent in the conventional magnetic tape recording and/or reproducing apparatus can be resolved.

It is another object of the present invention to provide a recording and/or reproducing apparatus for a magnetic tape whereby the magnetic tape is prevented from being destroyed to assure positive protection of the magnetic tape in order to realize tape loading.

It is a further object of the present invention to provide a recording and/or reproducing apparatus for a magnetic tape whereby the apparatus in its entirety can be reduced in size in order to simplify the structure for switching the operational modes.

It is a further object of the present invention to provide a recording and/or reproducing apparatus for a magnetic tape whereby the tape loading mechanism for pulling out the magnetic tape from the tape cassette loaded on the main body unit for loading on a pre-set tape running route can be reduced in size to reduce the size of the entire apparatus.

It is a further object of the present invention to provide a recording and/or reproducing apparatus for a magnetic tape whereby the magnetic tape can be prevented from being damaged and can be loaded or unloaded reliably in safety.

It is a further object of the present invention to provide a recording and/or reproducing apparatus for a magnetic tape whereby it is possible to prevent the rotary magnetic head device from being partially contacted with a portion of the tape loading mechanism during tape loading/unloading to prevent resulting destruction of the tape loading mechanism and/or the rotary magnetic head device.

It is yet another object of the present invention to provide a recording and/or reproducing apparatus for a magnetic tape whereby the magnetic tape can be taken up in trim state on the tape reel without slack on the occasion of fast feed or rewind of the magnetic tape.

For accomplishing the above objects, the present invention provides a recording and/or reproducing apparatus for a magnetic tape including a supply side reel for reeling out a magnetic tape, a supply side reel gear for rotationally driving the supply side reel, a takeup side reel for taking up the magnetic tape, a tape guide drum about which the magnetic tape pulled out from the tape cassette is wound, a takeup side reel gear for rotationally driving the takeup side reel, a tape loading mechanism for pulling out the magnetic tape from the tape cassette for placing it on the tape guide drum by way of tape loading and for separating the magnetic tape away from the tape guide drum for housing it in the tape cassette by way of tape unloading and a switching mechanism for switching the running direction of the magnetic tape pulled out from the tape cassette by the tape loading mechanism.

The switching mechanism has a counter gear movable between a position in which the counter gear selectively meshes with the supply side reel gear or the takeup side reel gear for selectively driving one of the supply side reel gear and the takeup side reel gear and a position in which the counter gear is positioned between the supply side reel gear and the takeup side reel gear and is spaced apart from one of the supply side reel gear and the takeup side reel gear. The counter gear is positioned during the magnetic tape loading operation by the tape loading mechanism between the supply side reel gear and the takeup side reel gear.

After the end of the unloading operation by the tape loading mechanism, the counter gear is moved to a position which is intermediate between the supply side reel gear and the takeup side reel gear and which is spaced apart from one of the supply side reel gear and the takeup side reel gear.

The tape loading mechanism includes a pair of movement guides movable between a position of pulling out the magnetic tape from the tape cassette and a position of wrapping the magnetic tape pulled out from the tape cassette about the tape guide drum, and a movement guide mechanism for moving the movable guides. There is further provided a driving mechanism for driving the movement mechanism of the tape loading mechanism.

The movement mechanism has a -cam gear having a cam portion for driving the movement mechanism and a slider moved by the cam gear for driving the movement mechanism.

The recording and/or reproducing apparatus according to the present invention further includes an operating mechanism for tilting one of the paired movement guides in a direction away from the tape guide drum when the paired movement guides are moved to a position proximate to the tape guide drum.

The recording and/or reproducing apparatus for the magnetic tape according to the present invention further includes supporting means for rotatably supporting the tape guide drum. An operating mechanism is provided on the supporting means.

The operating mechanism is a lug provided on the supporting means and which is abutted against the one movement guide for tilting the movement guide.

The recording and/or reproducing apparatus for the magnetic tape further includes a switching mechanism moved by the driving mechanism for selectively engaging the counter gear with one of the supply side reel gear and the takeup side reel gear.

The driving mechanism includes a cam gear having a cam portion for driving the switching mechanism and a slider moved by the cam gear for driving the switching mechanism.

The recording and/or reproducing apparatus for a magnetic tape includes a tape guide drum about which is wound the magnetic tape pulled out of a tape cassette, a tape pull-out mechanism having a pair of movement guides movable between a position of pulling out the magnetic tape from the tape cassette and a position of wrapping the magnetic tape pulled out from the tape cassette about the tape guide drum, and an operating mechanism for tilting one of the paired movement guides in a direction away from the tape guide drum when the paired movement guides have been moved to a position proximate to the tape guide drum.

The present invention also provides a recording and/or reproducing apparatus for a magnetic tape including a supply side reel for feeding out the magnetic tape, a takeup side reel for taking up the magnetic tape, rotation detection means for detecting rotation of the supply side reel and of the takeup side reel, and a running mechanism for running the magnetic tape at a constant speed. The running mechanism has a capstan and a capstan motor for rotationally driving the capstan and is adapted for running the magnetic tape at a constant speed. There is also provided control means for controlling the capstan motor based on results of detection from the detection means. The control means supplies a control signal to the capstan motor until the period of a detection signal from the detection means reaches a pre-set period so that the capstan motor is rotated in reverse when the running speed of the magnetic tape is slowed by the running mechanism.

The control means halts the supply of the control signal to the capstan motor when the period of the detection signal from the detection means is not less than the pre-set period.

The control means generates the duty of the control signal based on the results of detection of the supply side reel by the detection means and routes the generated duty to the capstan motor.

The control means calculates the amount of the magnetic tape wound about the supply side reel based on the results of detection by the detection means and generates the control signal based on the calculated results.

The present invention also provides a recording and/or reproducing apparatus for a magnetic tape including a supply side reel for feeding out the magnetic tape, a takeup side reel for taking up the magnetic tape, rotation detection means for detecting rotation of the supply side reel and of the takeup side reel, and a running mechanism for running the magnetic tape at a constant speed. The running mechanism has a capstan and a capstan motor for rotationally driving the capstan and being adapted for running the magnetic tape at a constant speed. There is provided control means for controlling the capstan motor based on results of detection from the detection means. The control means sends the control signal to the capstan motor until detection of cessation of rotation of the supply side reel and/or rotation of the takeup side reel on detection of tape end.

Other objects and illustrative advantages of the present invention will become apparent from the description of the preferred embodiments of the invention.

BEST MODE FOR CARRYING OUT THE INVENTION

In the following, a recording and/or reproducing apparatus for a magnetic tape according to the present invention, as applied to a tape recorder of the rotary magnetic head system, reduced to a portable size, is explained.

A tape cassette 1, used for a tape recorder of the rotary magnetic head system, embodying the present invention, is explained with reference to FIGS. 1 to 3.

Figure 1:
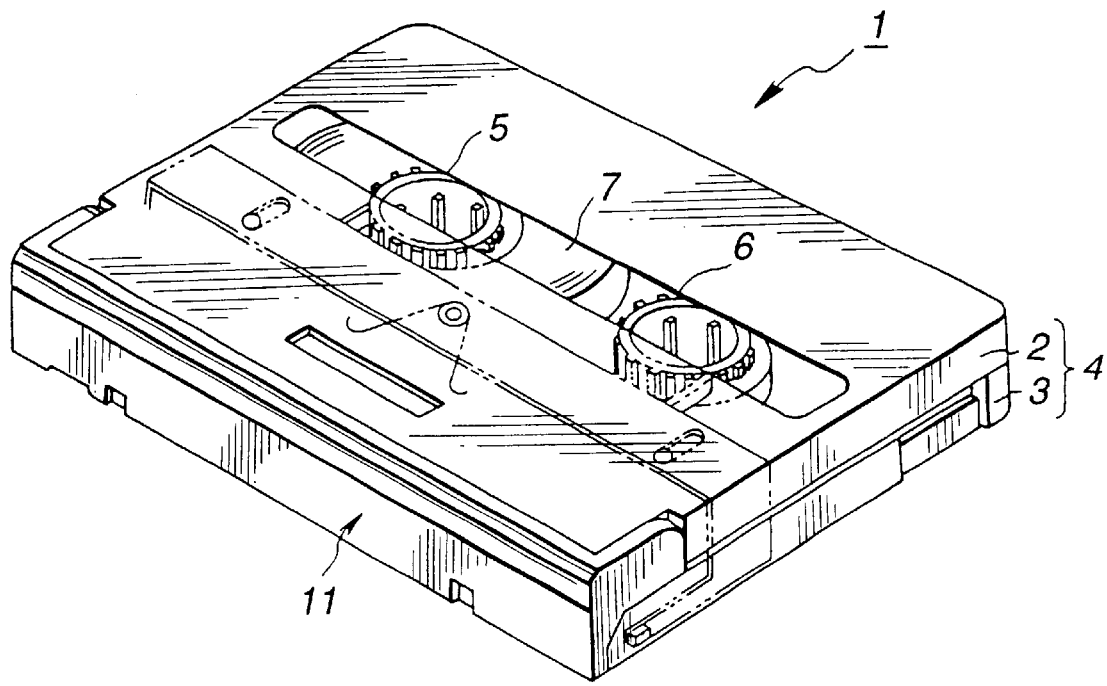
FIG. 1 is a perspective view, looking from the upper surface side, showing a tape cassette used in a tape recorder equipped with a rotary magnetic head device of the present invention.

The tape cassette 1 includes a main body unit of the cassette 4 made up of paired upper and lower cassette halves 2, 3, abutted and joined together, as shown in FIG. 1. The main body unit of the cassette 4 has paired tape reels 5, 6 mounted rotatably therein and holds a magnetic tape 7 placed on these tape reels. The magnetic tape 7, extended to outside the front surface of the main body unit of the cassette 4 via tape pull-out ports 8, 9 formed on both ends in the front side of the main body unit of the cassette 4, is placed across the tape reel 5 and the opposite side tape reel 6. On the front side of the main body unit of the cassette 4 is rotatably mounted a front lid 11 adapted for protecting the magnetic tape 7, extended on the front surface side of the main body unit of the cassette 4, during non-loading time of the tape cassette 1 on the tape recorder. The front lid 11 is rotationally biased in a direction of closing the magnetic tape 7, extended on the front surface of the main body unit of the cassette 4, by a torsion coil spring, not shown, mounted on a rotary shaft of the front lid 11.

Figure 2:
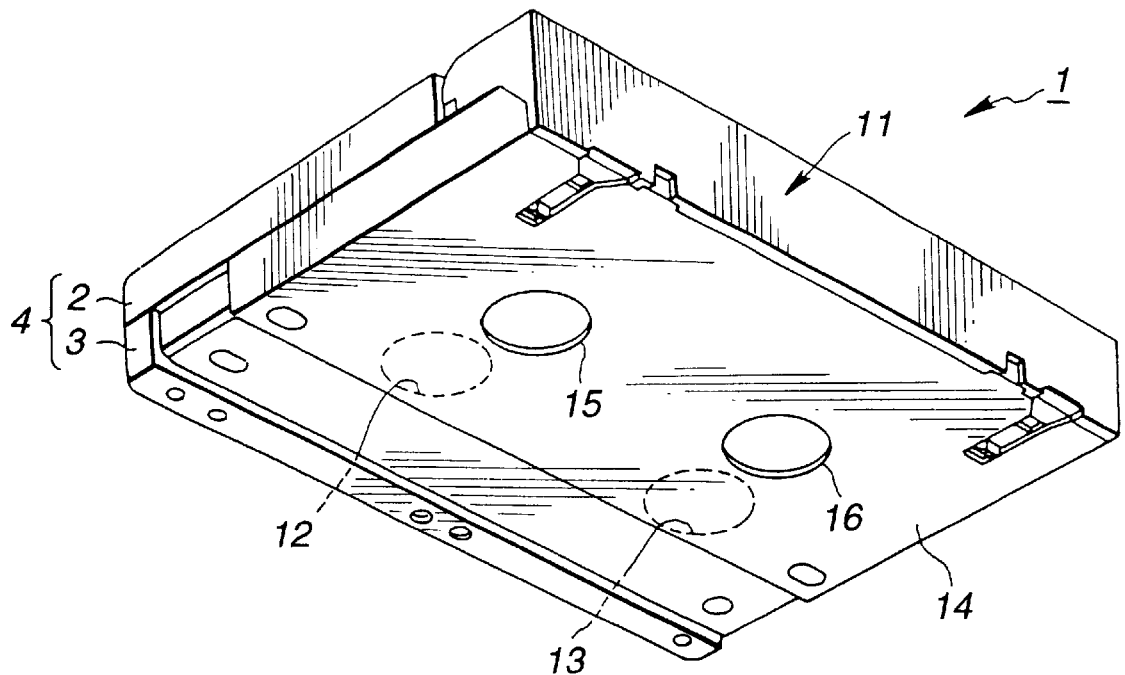
FIG. 2 is a perspective view showing the tape cassette, looking from the lower surface side.
Figure 3:
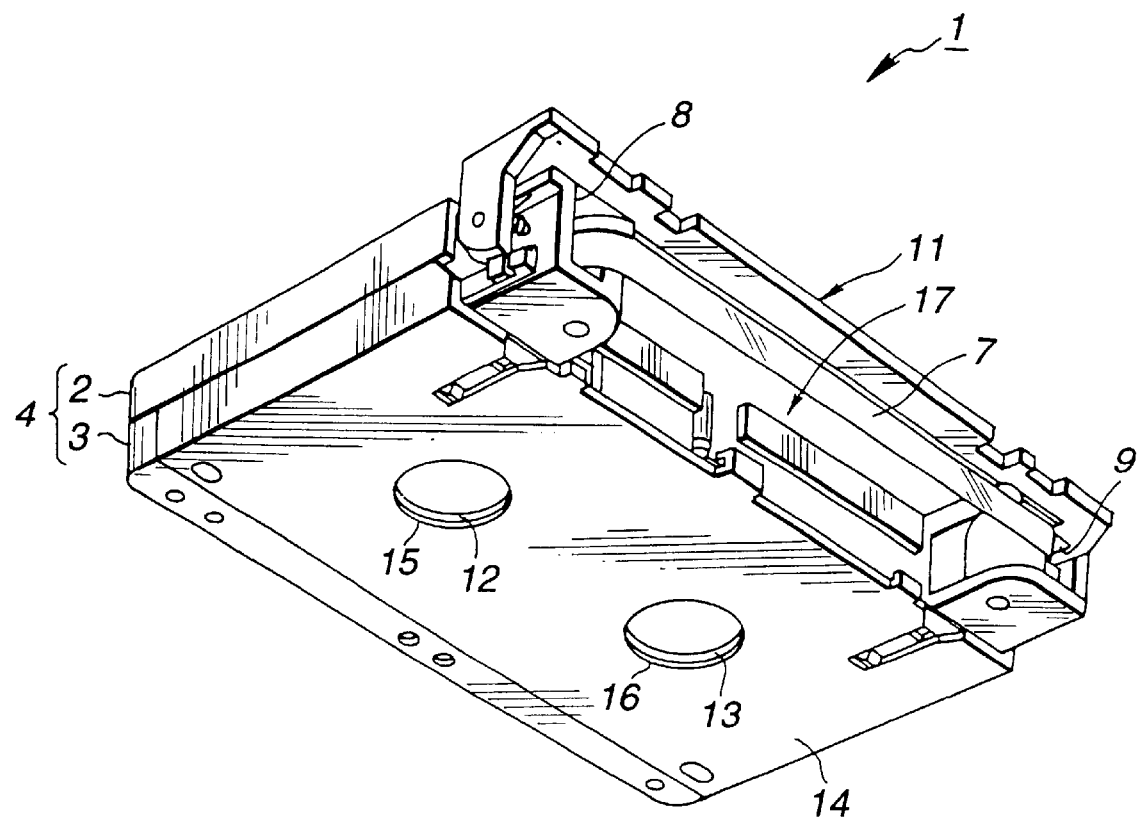
FIG. 3 is a perspective view, looking from the lower surface side, showing the tape cassette with the front lid opened.

On the bottom side of the main body unit of the cassette 4 is mounted a closure plate 14, as shown in FIGS. 2 and 3. This closure plate 14 is adapted for closing reel shaft insertion openings 12, 13 bored in the bottom surface of the main body unit of the cassette 4 during non-loading of the tape cassette 1 on the tape recorder for preventing intrusion of dust and dirt into the main body unit of the cassette 4 for protecting the magnetic tape 7. The major surface of the closure plate 14 is formed with paired insertion openings 15, 16. When the closure plate 14 is moved rearwards relative to the main body unit of the cassette 4, the insertion openings 15, 16 are in register with the reel shaft insertion openings 12, 13, as shown in FIG. 3, to permit a reel-driving shaft provided on the tape recorder to be intruded into the main body unit of the cassette 4. If the closure plate 14 is moved forwards of the tape cassette 1 to pull out the magnetic tape 7 extending on the front side of the main body unit of the cassette 4 to outside the main body unit of the cassette 4 to close the lower side of a spacing 17 faced by tape pull-out means of the tape loading mechanism provided on the tape recorder, the insertion openings 15, 16 of the closure plate 14 are offset relative to the reel shaft insertion openings 12, 13 in the lower half 3 so that the reel shaft insertion openings 12, 13 are closed by the major surface of the closure plate 14.

If inserted via cassette insertion/ejection opening provided in the main body unit of the tape recorder, the tape cassette 1 is held by the cassette holder and loaded on a cassette loading unit provided in the main body unit of the tape recorder. As the cassette holder is moved in a direction towards the cassette loading unit, the front lid 11 is rotated by the lid opening/closing mechanism provided in the main body unit of the tape recorder for opening the front side of the main body unit of the cassette 4. The magnetic tape 7, housed within the main body unit of the cassette 4, is pulled out of the main body unit of the cassette 4 by the tape loading mechanism provided on the tape recorder so as to be extended on the tape running route within the main body unit of the tape recorder and so as to be wrapped around the tape guide drum of the magnetic head device by way of loading.

Figure 4:
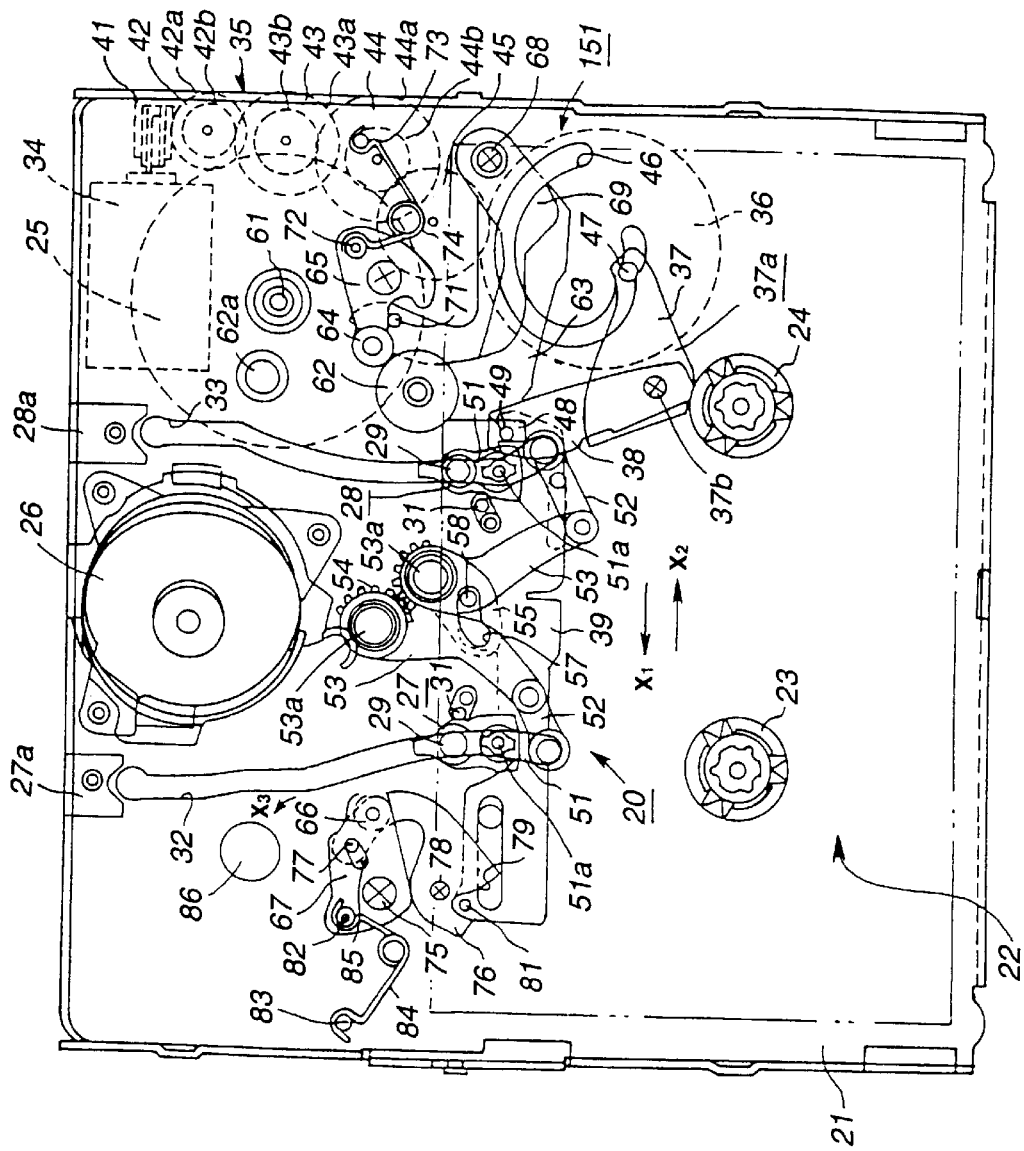
FIG. 4 is a plan view showing the mechanical portion of the tape recorder provided with the rotary magnetic head device according to the present invention.

The tape recorder of the rotary magnetic head type, employing the above-described tape cassette 1 as a recording medium, according to the present invention, includes a cassette holder, not shown, supported for rotation between a first position for insertion/ejection of the tape cassette 1 outside of the casing of the main body unit of the tape recorder and a second position of loading the tape cassette 1 on a cassette loading unit 22 provided on a base 21, and an outer lid rotatably mounted on a lid adapted for covering the cassette holder rotated towards the cassette loading unit 22, as shown in FIG. 4.

The tape cassette 1 is loaded on the cassette loading unit 22 by rotation of the cassette holder from the first position enabling insertion/ejection of the tape cassette 1 towards the cassette loading unit 22. On the cassette loading unit 22 provided on the base 21 are arranged reel shafts 23, 24 engaged with tape reels 5, 6 in the tape cassette 1 for rotating the tape reels 5, 6 for take-up of the magnetic tape 7 on one of the tape reels 5, 6. These tape reels 23, 24 are rotated by a driving power transmission unit 152, as later explained, using. a capstan motor 25 as a driving source.

On the base 21 is mounted a rotary magnetic head device 26 for facing the cassette loading unit 22 carrying the reel shafts 23, 24. The magnetic tape 7 pulled out from the tape cassette is wound about the rotary magnetic head device 26. Between the cassette loading unit 22 for the tape cassette 1 and the rotary magnetic head device 26 are arranged paired first and second movable guide blocks 27, 28 of a tape loading mechanism 20 adapted for pulling out the magnetic tape 7 from the tape cassette 1 for running the tape about a rotary tape guide drum of the rotary magnetic head device 26. These first and second movable guide blocks 27, 28 are provided with a tape guide roll 29 and an inclined guide pin 31 about which the magnetic tape 7 is hooked and which guides the magnetic tape 7 over a pre-set angle, such as about 160°, about the tape guide drum of the rotary magnetic head device 26. The first and second movable guide blocks 27, 28 are guided by movement guide grooves 32, 33 formed in the base 21 so as to be moved between the position shown in FIG. 4 in which the tape guide roll 29 and the inclined guide pin 31 face the spacing 17 of the tape cassette 1 loaded on the cassette loading unit 22 and the position in which the tape guide roll 29 and the inclined guide pin 31 are located laterally of the rotary magnetic head device 26.

The first and second movable guide blocks 27, 28 are moved along the movement guide grooves 32, 33 by a guide block movement actuating unit 151 as now explained. The first and second movable guide blocks 27, 28 are moved by a driving motor 34, as a driving source, provided independently of the capstan motor 25 for running the magnetic tape 7. The guide block movement actuating unit 151 includes a driving motor 34, a cam gear 36 connected thereto via a gear train 35 and a slider 39 connected thereto via a rotation actuating member 37a having first and second connection arms 37, 38.

The gear train 35 includes a worm gear 41, mounted on a driving shaft o,f the driving motor 34, a first counter gear 42, having coaxial first and second gears 42a, 42b, and a second counter gear 43, having coaxial first and second gears 43a, 43b. The first gear 43a meshes with the second gear 42b of the first counter gear 42. The gear train 35 also includes a third counter gear 44 having coaxial first and second gears 44a, 4b and a fourth counter gear 45 meshing with the third gear 44b and with the cam gear 36. The first gear 44a meshes with the second gear 43b of the second counter gear 43.

Figure 5:
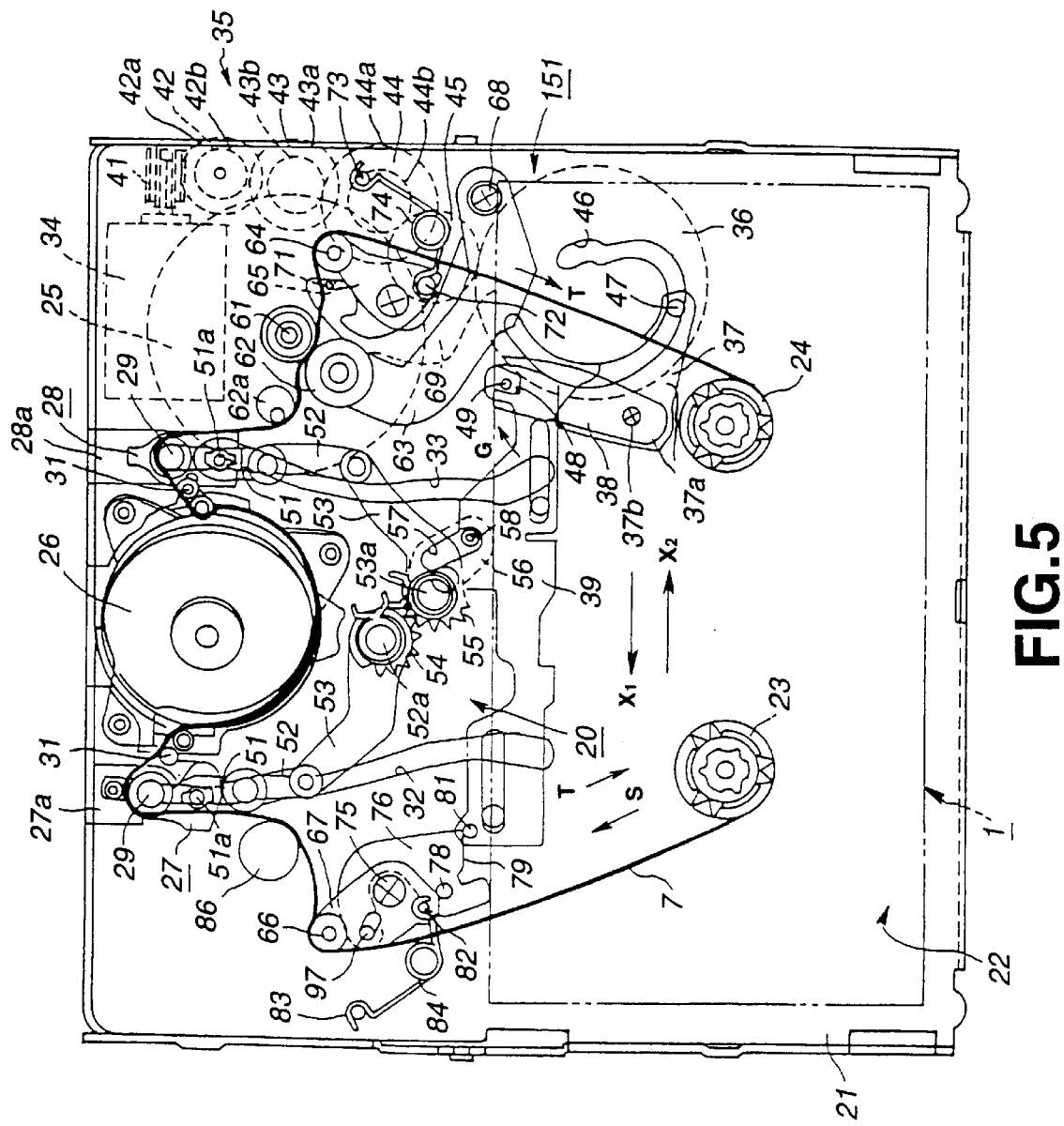
FIG. 5 is a plan view showing the magnetic tape pulled out to the tape running route and wound on the tape guide drum.

The rotation actuating member 37a, interconnecting the gear train 35 and the cam gear 36, is formed with upstanding first and second connection arms 37, 38 in a direction of crossing each other, and is substantially L-shaped in its entirety, as shown in FIGS. 4 and 5. This rotation actuating member 37a has the proximal end carrying the first and second connection arms 37, 38 supported by a pivot 37b provided with base 21 so as to be rotated about the pivot 37b.

The cam gear 36 is formed with a first cam groove 46 for moving the movable guide blocks 27, 28. This first cam groove 46, formed for extending along the rim of the cam gear 36, is engaged by an engagement pin 47 provided on the first connection arm 37 extended from the rotation actuating member 37a. The second connection arm 38, extending in a direction perpendicular to the first connection arm 37 of the rotation actuating member 37a, is formed on its one end with an engagement recess 48. This engagement recess 48 is engaged by an engagement pin 49 provided on the slider 39 which is mounted for movement in the directions indicated by arrows $X_1$ and $X_2$ in FIG. 4. This slider 39 is moved between two positions, that is between the unloading position in which the slider is moved in the direction as indicated by arrow $X_1$ in FIGS. 4 and 5 and the loading position in which the slider is moved in the direction as indicated by arrow $X_2$ in FIGS. 4 and 5.

Figure 6:
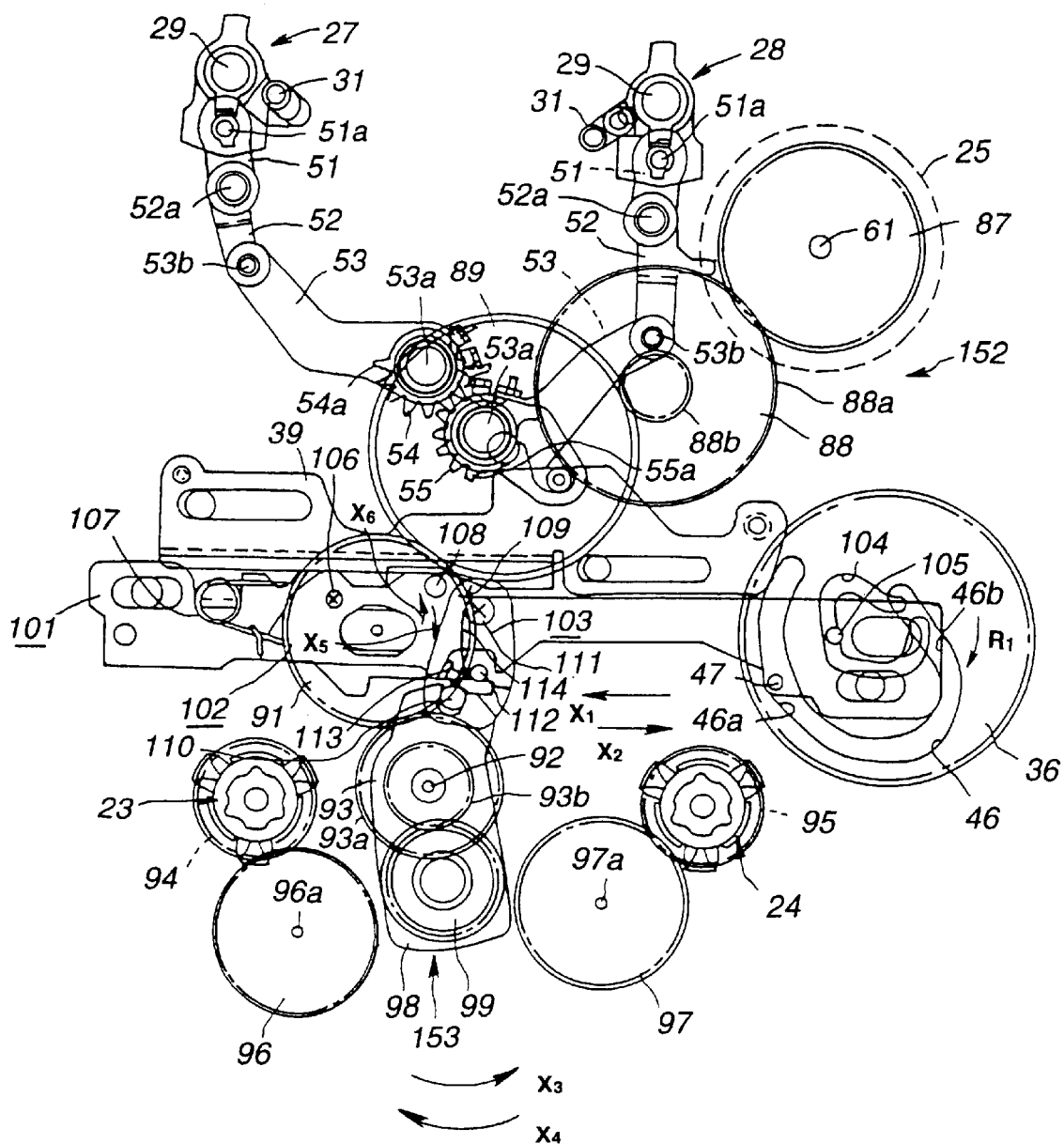
FIG. 6 is a plan view showing a driving power transmission unit for transmitting the driving power of the driving power to a reel shaft gear.

On the other hand, the first and second movable guide blocks 27, 28 are mounted on the distal ends of first connection arms 51, 51 for rotation via pivots 51a, 51a, as shown in FIG. 6, these first connection arms 51, 51 having proximal ends supported by the distal ends of second connection arms 52, 52 for rotation via pivots 51a, 51a, respectively. These second connection arms 52, 52 are supported for rotation via pivots 53b, 53b on the distal ends of third connection arms 53, 53 having proximal ends rotatably supported via pivots 53a, 53a set upright on the base 21.

Figure 7:
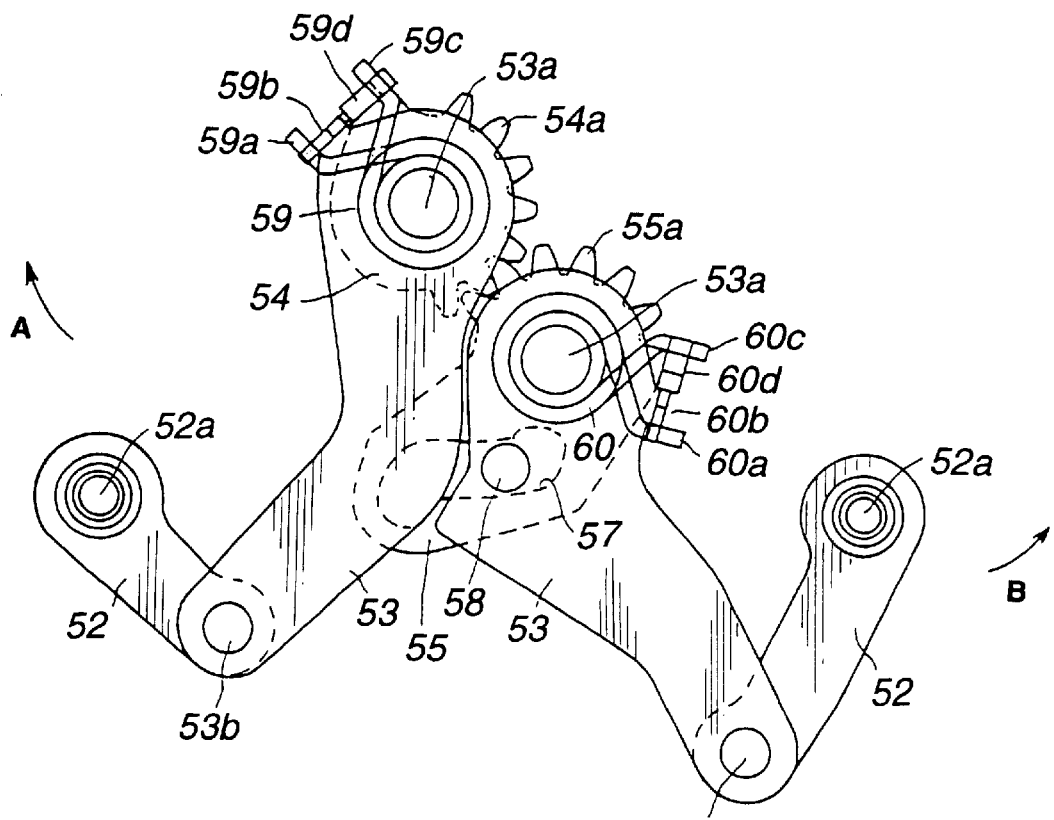
FIG. 7 is a plan view showing a third connection arm portion rotated by a movement actuation unit of the movable guide block.
Figure 8:
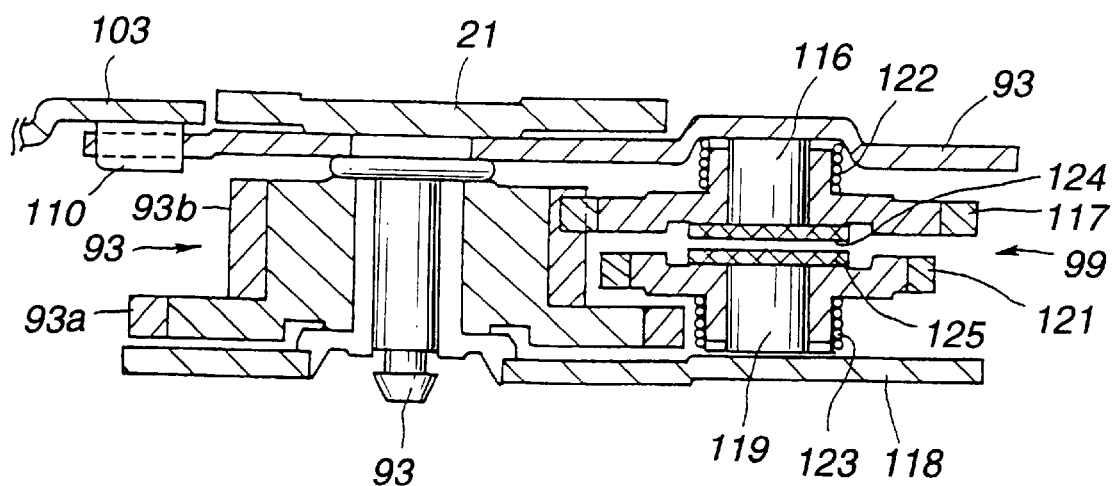
FIG. 8 is a cross-sectional view showing a clutch gear mounted on a rotary base block.

On the pivots 53a, 53a supporting the third connection arms 53, 53 are rotatably mounted limiter plates 54, 55, on the outer rim of which are formed gears 54a,54b meshing with each other, as shown in FIG. 7. That is, the third connection arms 53, 53 and the limiter plates 54, 55 are mounted coaxially via pivots 53a, 53a, respectively. Between the third connection arms 53, 53 and the limiter plates 54, 55 are mounted first and second torsion coil springs 59, 60, respectively. The first torsion coil spring 59 is mounted by having the distal end of its arm 59a retained by a spring retainer 59b formed by warping the proximal end of one of the third connection arms 53, 53 and by having the other arm 59c retained by a spring retainer 59d formed on the outer rim of the limiter plate 54. The first torsion coil spring 59 is biased in a direction in which its first and second arms 59a, 59c are spaced apart from each other, so that one of the third connection arms 53, 53 is biased for rotation in a direction indicated by arrow A in FIG. 7 under the bias of the first torsion coil spring 59.

A second torsion coil spring 60 is mounted by having the distal end of its arm 60a retained by a spring retainer 60b formed by warping the proximal end of the opposite side third connection arm 53 and by having the opposite side arm 60c retained by a spring retainer 60d formed on the outer rim of the opposite side limiter plate 55. The second torsion coil spring 60 is biased in a direction in which its first and second arms 60a, 60c are spaced apart from each other, so that the other third connection arm 53 is biased for rotation in a direction indicated by arrow B in FIG. 7 under the bias of the second torsion coil spring 60.

The opposite side limiter plate 55 is formed with a cam opening 57 in which is engaged a supporting pin 58 provided on the slider 39.

When the first and second movable guide blocks 27, 28 supported by the first connection arms 51, 51 connected via second connection arms 52, 52 to the third connection arms 53, 53 are moved to the trailing ends of movement guide recesses 32, 33, the third connection arms 53, 53 are rotationally biased in the direction indicated by arrows A and B in FIG. 7, under the bias of the first and second torsion coil springs 59, 60, for abutting the first and second movable guide blocks 27, 28 against positioning members 27a, 28a.

If the driving motor 34 is run in rotation, the cam gear 36 of the guide block movement actuating unit 151 is rotated via gear train 35 for moving the slider 39 via the first connection arm 37 and second connection arm 38. If the slider 39 is moved in this manner, the opposite side limiter plate 55, in the cam opening 57 of which is engaged the supporting pin 58 provided on the slider 39, is rotated about pivot 53a as center of rotation. By rotation of the opposite side limiter plate 55, the limiter plate 54, provided with a gear 54a meshing with a gear 55a provided on the limiter plate 55, is rotated in the opposite direction to the direction of rotation of the other limiter plate 55, about the pivot 53a as center of rotation. The first and second movable guide blocks 27, 28 are moved by the first to third connection arms 51 to 53, under guidance by the movement guide grooves 32, 33, from the position facing the spacing 17 of the tape cassette 1 loaded on the cassette loading unit 22 to the position of FIG. 5 laterally of the rotary magnetic head device corresponding to the loading end position of the magnetic tape 5. The result is that the magnetic tape 7 within the tape cassette 1 is pulled out from the tape cassette 1 so as to be wrapped about the tape guide drum of the rotary magnetic head device 26, as shown in FIG. 5.

Between the cassette loading unit 22 and the rotary magnetic head device 26 are rotatably mounted a pinch roll supporting arm 63, a tape guide supporting arm 65, carrying on its distal end an upstanding tape guide 64, and a tape guide supporting arm 67, carrying at its distal end a tape guide 66. The pinch roll supporting arm 63 has mounted on its distal end a pinch roll 62 pressed against a capstan shaft 61 for clinching the magnetic tape 7 for assuring constant speed running of the magnetic tape 7. The capstan shaft 61 is a driving shaft of the capstan motor 25 adapted for running the magnetic tape 7.

The pinch roll supporting arm 63 has its proximal end supported by a pivot 68 so that the pinch roll supporting arm 63 is rotated about the pivot 68 as center of rotation. On this pivot 68 is rotatably mounted a thrusting lever 69, coaxially with the pinch roll supporting arm 63, for thrusting the tape guide supporting arm 65. On one distal end of the thrusting lever 69 is mounted a thrusting lug 71 adapted for thrusting the tape guide supporting arm 65. On the tape guide supporting arm 65 is mounted a toggle spring 74 between a retention lug 72 provided on the tape guide supporting arm 65 and a retention lug 73 set upright on the base 21.

When the first and second movable guide blocks 27, 28 are moved from the position facing the spacing 17 of the tape cassette 1 as shown in FIG. 4 to the loading end position for the magnetic tape 7 as shown in FIG. 5 in which the first and second movable guide blocks 27, 28 are positioned laterally of the rotary magnetic head device 26, the pinch roll supporting arm 63 is enabled to be rotated from the position towards the cassette loading unit 22 shown in FIG. 4 towards the position in which the pinch roll 62 is pressed against the capstan shaft 61 as shown in FIG. 5. The thrusting lever 69 then is rotated from the position towards the cassette loading unit 22 shown in FIG. 4 to the position towards the capstan shaft 61 shown in FIG. 5. The thrusting lever 69 then thrusts the tape guide supporting arm 65 by the thrusting lug 71. The tape guide supporting arm 65 is moved under the bias of the toggle spring 74 from the position shown in FIG. 4 in the direction of causing the magnetic tape 7 to be taken up on the capstan shaft 61 as shown in FIG. 5.

The tape guide supporting arm 67 is rotated about a pivot 75 as the center of rotation so that the tape guide 66 is moved from a position towards the inside of the base 21 as shown in FIG. 4 to a position outwardly of the base 21 as shown in FIG. 5. The tape guide supporting arm 67 also has its rotational position controlled by a toggle spring 84 installed between a retention lug 82 provided on the tape guide supporting arm 67 and a retention lug 83 set upright on the base 21. Rotation o the tape guide supporting arm 67 is by a rotary lever 76. On one distal end of the rotary lever 76 is set a guide pin 77 engaged in a guide opening 85 bored in the tape guide supporting arm 67. Also, the tape guide supporting arm 67 is rotated about the pivot 75 set on the base 21. On the lateral edge on the proximal end of the rotary lever 76 is formed a recessed cam 79 abutted by a thrusting pin 81 provided on the slider 39.

With the tape guide supporting arm 67, associated with the slider 39, when the slider 39 is moved in the direction of arrow $X_2$ in FIG. 4, the thrusting pin 81 thrusts the cam 79 of the rotary lever 76 to rotate the rotary lever 76 in the direction indicated by arrow $X_3$ in FIG. 4, at the same time as the tape guide supporting arm 67 is rotated in the same direction as the rotary lever 76. This shifts the tape guide 66 from the position inwardly of the base 21 shown in FIG. 4 to the position outwardly of the base 21 as shown in FIG. 5.

With the tape recorder, having the above-described tape loading mechanism 20, if the tape cassette 1 is loaded on the cassette loading unit 22, the magnetic tape 7 is pulled outwards by the tape guide roll 29 and the inclined guide pin 31 of the first and second movable guide blocks 27, 28 so as to be wrapped around the rotary magnetic head device 26. The magnetic tape 7 is placed around the tape guide 66 and a tape guide 86 set on the base 21 so as to be wound about the rotary magnetic head device 26 via the tape guide roll 29 and the inclined guide pin 31 of the first movable guide block 27. The magnetic tape 7, reeled out from the rotary magnetic head device 26, is clinched between the capstan shaft 61 and the pinch roll 62, via the inclined guide pin 31 of the second movable guide block 28, tape guide roll 29 and tape guide 62a set on the base 21, so as to be placed about the tape guide pin 64. The magnetic tape 7 then reaches the take-up side tape reel 24 on the take-up side within the tape cassette 1.

The driving power transmission unit 152 for rotating the reel shafts 23, 24 as the capstan motor 25 as a driving source is explained by referring to FIG. 6 showing the state of loading the magnetic tape 7 on the tape running route of the main body unit of the tape recorder.

Referring to FIG. 6, the driving power transmission unit 152 includes a capstan gear 87, mounted on the capstan shaft 61, as a driving shaft of the capstan motor 25, for rotation in unison with the capstan shaft 61, and a first drive transmission gear 88 formed as one with coaxial first gear 88a of larger diameter and second gear 88b of lesser diameter. The first gear 88a meshes with the capstan gear 87. The driving power transmission unit 152 also includes a second drive transmission gear 89 meshing with the second gear 88b of the first drive transmission gear 88 and a third drive transmission gear 91 meshing with the second drive transmission gear 89. The driving power transmission unit 152 further includes a fourth drive transmission gear 93 carried by a pivot 92 operating as a fulcrum of rotation of a rotary base block 98 which will be explained subsequently in detail. This fourth drive transmission gear 93 has a first gear portion 93a of larger diameter and a second gear portion 93b of lesser diameter, mounted coaxially with each other, with the first gear portion 93a and the second gear portion 93b meshing with the a third drive transmission gear 91 and with a clutch gear 99, carried by the rotary base block 98, respectively.

The clutch gear 99 will be explained subsequently in detail.

On the reel shafts 23, 24 are coaxially mounted reel shaft gears 94, 95, meshing with reel shaft driving gears 96, 97, respectively. These reel shaft driving gears 96, 97 are rotatably carried on the base 21 via pivots 96a, 97a, respectively. When the rotary base block 98 is rotated about the pivot 92 as center, the reel shafts 23, 24 mesh with one of the reel shaft driving gears 96, 97 to rotate the driving gear.

Referring to FIGS. 6 to 8 and FIG. 13, a reel shaft selection unit 153 for selecting one of the reel shafts 23, 24 is explained in detail.

Referring to FIG. 6, the reel shaft selection unit 153 includes a cam gear 36, a slider 39 constituting the guide block movement actuating unit 151 and a reel shaft selecting slider 101 movably mounted side-by-side with the slider 39. The guide block movement actuating unit 151 is moved via the rotation actuating member 37a and the engagement pin 47 of the first connection arm 37 of which is engaged in the first cam groove 46 in the cam gear 36. The reel shaft selection unit 153 also includes a reel shaft selection slider 101 movably mounted side-by-side with respect to the slider 39, a rotary lever 102 rotatably mounted on the reel shaft selection slider 101 and a connection member 103 rotatably mounted on the reel shaft selection slider 101 for rotatably interconnecting the reel shaft selection slider 101 and the rotary base block 98.

On the inner peripheral side of the above-mentioned first cam groove 46 of the cam gear 36 is formed a second cam gear 104. This, second cam gear 104 is engaged by an engagement pin 105 set upright on one end of the reel shaft selection slider 101. By rotation of the cam gear 36, the reel shaft selection slider 101 is rotated in the direction indicated by arrow $X_1$ or $X_2$ in FIG. 6 for rotating the rotary base block 98 mounted via connection member 103 in the direction indicated by arrow $X_3$ or $X_4$ in FIG. 6.

The reel shaft selection slider 101 is mounted side-by-side with the slider 39 on the base 21 for movement in the direction indicated by arrow $X_1$ or $X_2$ in FIG. 6. This reel shaft selection slider 101 is selectively moved to three positions, namely a first position in which the slider has been moved in the direction indicated by arrow $X_1$ in FIG. 6 for running the magnetic tape 7 at a constant velocity in the forward direction, a second position in which the slider has been moved in the direction indicated by arrow $X_2$ in FIG. 6 for running the magnetic tape 7 in the reverse direction and a third neutral position between these first and second positions. On the reel shaft selection slider 101 is mounted the rotary lever 102 for rotation in the direction indicated by arrow $X_5$ or $X_6$ in FIG. 6 with a pivot 106 set thereon as the center of rotation. Between the rotary lever 102 and the reel shaft selection slider 101 is mounted a toggle spring 107 for biasing the rotary lever 102 in the direction indicated by arrow $X_6$ in FIG. 6. On the rotary lever 102 is also set a thrust pin 108 which is thrust by a cam portion 109 provided on the slider 39 provided side-by-side above the reel shaft selection slider 101 in FIG. 6. The cam portion 109 is formed with an inclined surface protruded towards the reel shaft selection slider 101. When the slider 39 is moved in the direction indicated by arrow $X_1$ in FIG. 6, for example, the thrust pin 108 is thrust by the cam portion 109 to rotate the rotary lever 102 in the direction indicated by arrow $X_5$ in FIG. 6 against the bias of the toggle spring 107.

Towards the base 21, a pivot 111 is set on the reel shaft selection slider 101, and the connection member 103 is rotatably mounted with this pivot 111 as the center of rotation. On the connection member 103 is formed a control pin 112 which is exposed further to outside via a recess 113 formed below the reel shaft selection slider 101 in FIG. 6 and an opening 114 constituted by an end face of the rotary lever 102 partially covering the recess 113. On the side of the connection member 103 not carrying the pivot 111 is mounted the rotary base block 98, for rotation in the direction indicated by arrow $X_3$ or $X_4$ in FIG. 6, with the pivot 110 as the center of rotation.

The rotary base block 98 is mounted for rotation in the direction indicated by arrow $X_3$ or $X_4$ in FIG. 6, by the above-mentioned capstan motor 25 as a driving source, with the pivot 92 of the fourth drive transmission gear 93 as the center of rotation. The fourth drive transmission gear 93 constitutes the driving power transmission unit 152 causing rotation of the reel shafts 23, 24. This rotary base block 98 is rotated via the connection member 103 by movement of the reel shaft selection slider 101 in the direction indicated by arrow $X_1$ or $X_2$ in FIG. 6. The rotary base block 98 is provided with the above-mentioned fourth drive transmission gear 93 and the clutch gear 99.

Referring to FIG. 7, the clutch gear 99 includes an upper gear portion 117, carried by an upper shaft 116 set on the rotary base block 98, and a lower gear portion 121 carried by a lower shaft 119 set on a base block 118 formed as-one with the pivot 93. Between the upper gear portion 117 and the rotary base block 98 is mounted a first compression coil spring 122. Similarly, between the lower gear portion 119 and the base block 118 is mounted a second compression coil spring 123. On facing surfaces of the upper gear portion 117 and the lower gear portion 121 are mounted friction members 124, 125 formed of a material having a high frictional coefficient, such as felt. The upper gear portion 117 and the lower gear portion 119 are thrust towards each other under a pre-set bias so that the friction members 124, 125 are in pressure contact with each other. The upper gear portion 117 meshes with the gear portion 93b of the fourth drive transmission gear 93, while the lower gear portion 119 meshes with one of the reel shaft driving gears 96, 97. If a larger load is applied on the lower gear portion 119, there is generated slip between the frictional member 125 of the lower gear portion 119 and the frictional member 124 of the upper gear portion 117 to prevent a large load from being applied against the upper gear portion 117.

Referring to FIG. 6, the Capstan motor 25 is driven for rotating the clutch gear 99 via the driving power transmission unit 152 rotating the reel shafts 23, 24 for rotating the rotary base block 98 provided with the clutch gear 99 in the direction indicated by arrow $X_3$ or $X_4$ in FIG. 6. The clutch gear 99 meshes with one of the reel shaft driving gears 96, 97. The rotary base block 98 also is rotated compulsively in the direction indicated by arrow $X_3$ or $X_4$ by movement of the reel shaft selection slider 101 in the direction indicated by arrow $X_1$ or $X_2$ in FIG. 6.

The operation of the above-described reel shaft selection unit 153 is explained with reference to FIGS. 6 and 9 to 13.

First, the loading start position of loading the magnetic tape 7 on the tape running route on the base 21, as shown in FIG. 5, with the the tape cassette 1 loaded on the cassette loading unit 22 of the tape recorder, is explained with reference to FIG. 9.

Figure 9:
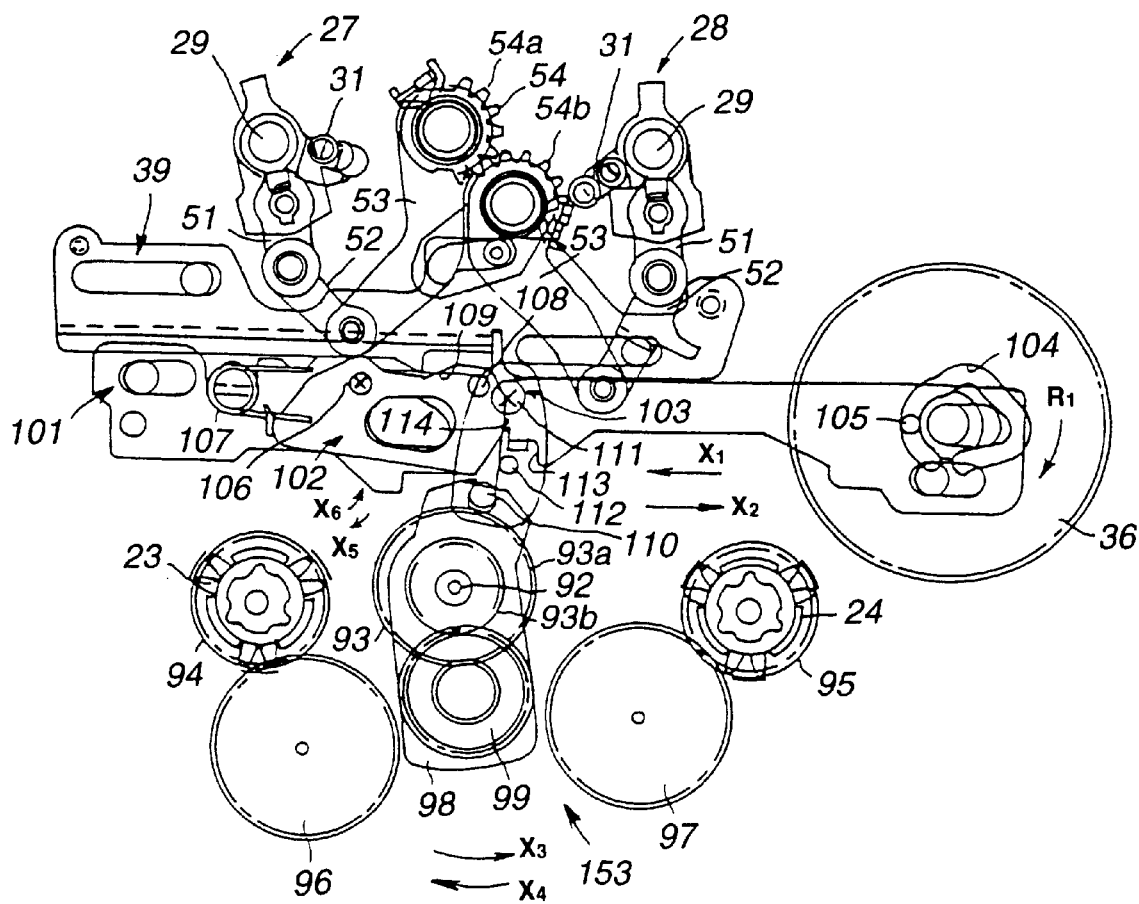
FIG. 9 is a plan view of a reel shaft selection unit showing the magnetic tape being pulled out from the tape cassette.

In this state, the slider 39 is at the unloading position in which the slider has been moved in the direction of arrow $X_1$ in FIG. 9. On the other hand, the reel shaft selection slider 101 has been moved in the direction of arrow $X_2$ in FIG. 9. At this time, the rotary lever 102 has the thrust pin 108 thrust by the cam portion 109 provided on the slider 39 and is thereby rotated in the direction of arrow $X_5$ in FIG. 9. On the end face of the rotary lever 102 is abutted the control pin 112. The rotary base block 98 is at an intermediate position such that the clutch gear 99 is not engaged with the reel shaft driving gear 96 nor with the reel shaft driving gear 97. Thus, the tape reels 5, 6 of the tape cassette 1 are in the rotatable state, such that, by movement of the first and second movable guide blocks 27, 28 from the position facing the spacing 17 of the tape cassette 1 to the position laterally of the rotary magnetic head device 26, the tape reels 5, 6 pull out the magnetic tape 7 from the tape cassette 1 to the tape running route shown in FIG. 5, so that the tape is wound about and can run along the tape guide drum of the rotary magnetic head 26.

When the magnetic tape 7 is wound about and can run along the tape guide drum of the rotary magnetic head device 26, the tape recorder is first set to the halted state. In this halted state, the reel shaft selection unit 153 shifts the slider 39 in the direction indicated by arrow $X_2$ in FIG. 10 from the unloading position to the loading position. The reel shaft selection slider 101 is moved in the direction indicated by arrow $X_1$ in FIG. 10 to an intermediate position. The reel shaft selection slider 101, thus moved in the direction indicated by arrow $X_1$ in FIG. 10, rotates the rotary base block 98 in the direction indicated by arrow $X_3$ in FIG. 10, from the state shown in FIG. 8, as far as the neutral position. Therefore, the clutch gear 99 is engaged with none of the reel shaft driving gears 96, 97. By movement of the slider 39 in the direction indicated by arrow $X_2$ in FIG. 10 and by movement of the reel shaft selection slider 101 in the direction indicated by arrow $X_1$ in FIG. 10, the thrust pin 108 is not thrust by the cam portion 109, such that the rotary lever 102 is rotated in the direction indicated by arrow $X_6$ in FIG. 10 under the bias of the toggle spring 107. In this state, the control pin 112 is abutted against the end face of the rotary lever 102, while being controlled by the recess 113.

Figure 10:
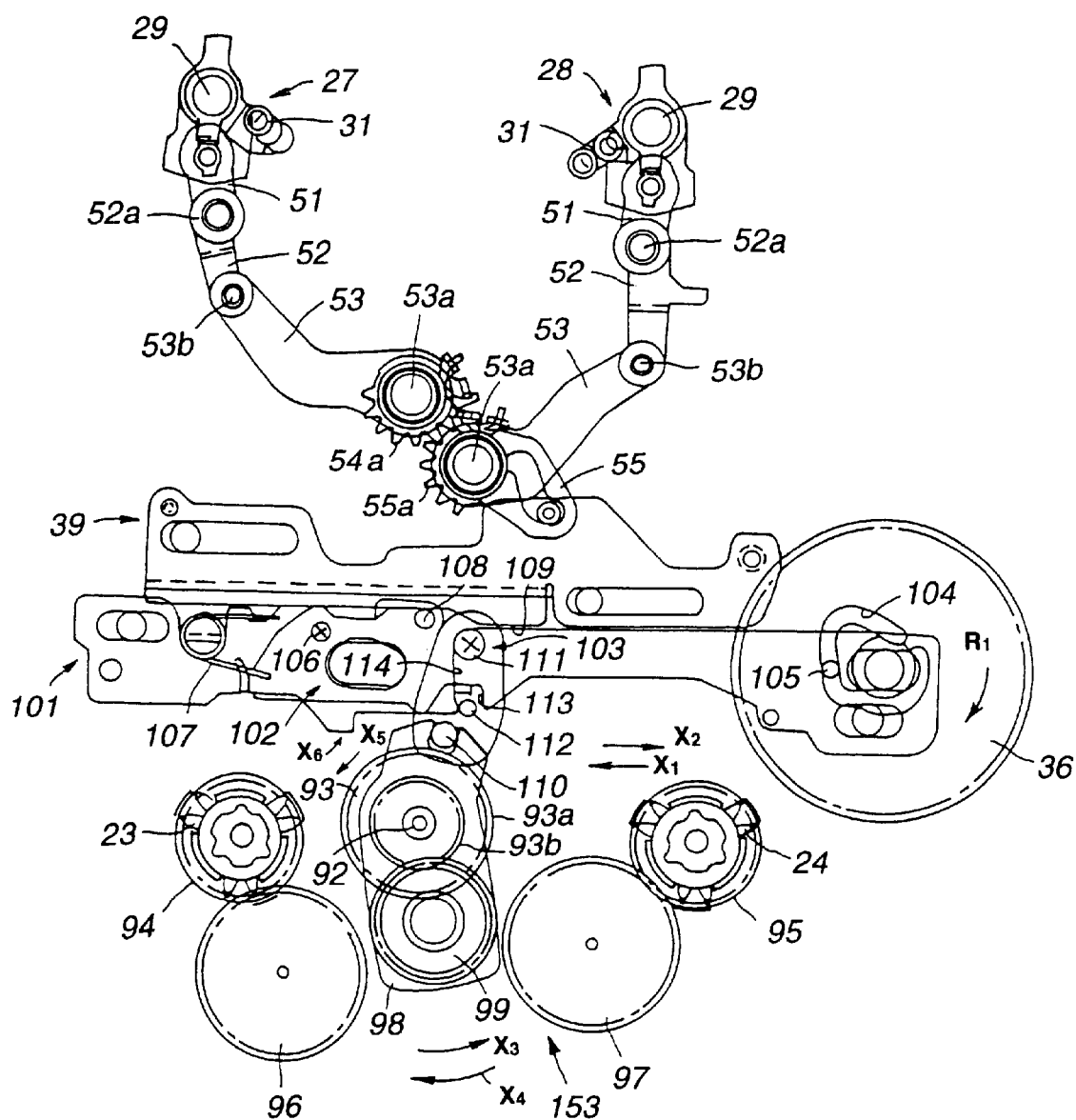
FIG. 10 is a plan view of the reel shaft selection unit showing the magnetic tape being completely pulled out from the tape cassette.

Meanwhile, during the fast feed mode of running the magnetic tape 7 at an elevated speed in the forward direction, and during the rewind mode of running the magnetic tape 7 at an elevated speed in reverse, the reel shaft selection slider 101 is put at the neutral position in which it has been moved in the direction indicated by arrow $X_1$ in FIG. 10, with the clutch gear 99 meshing with none of the reel shaft driving gears 96, 97.

Figure 11:
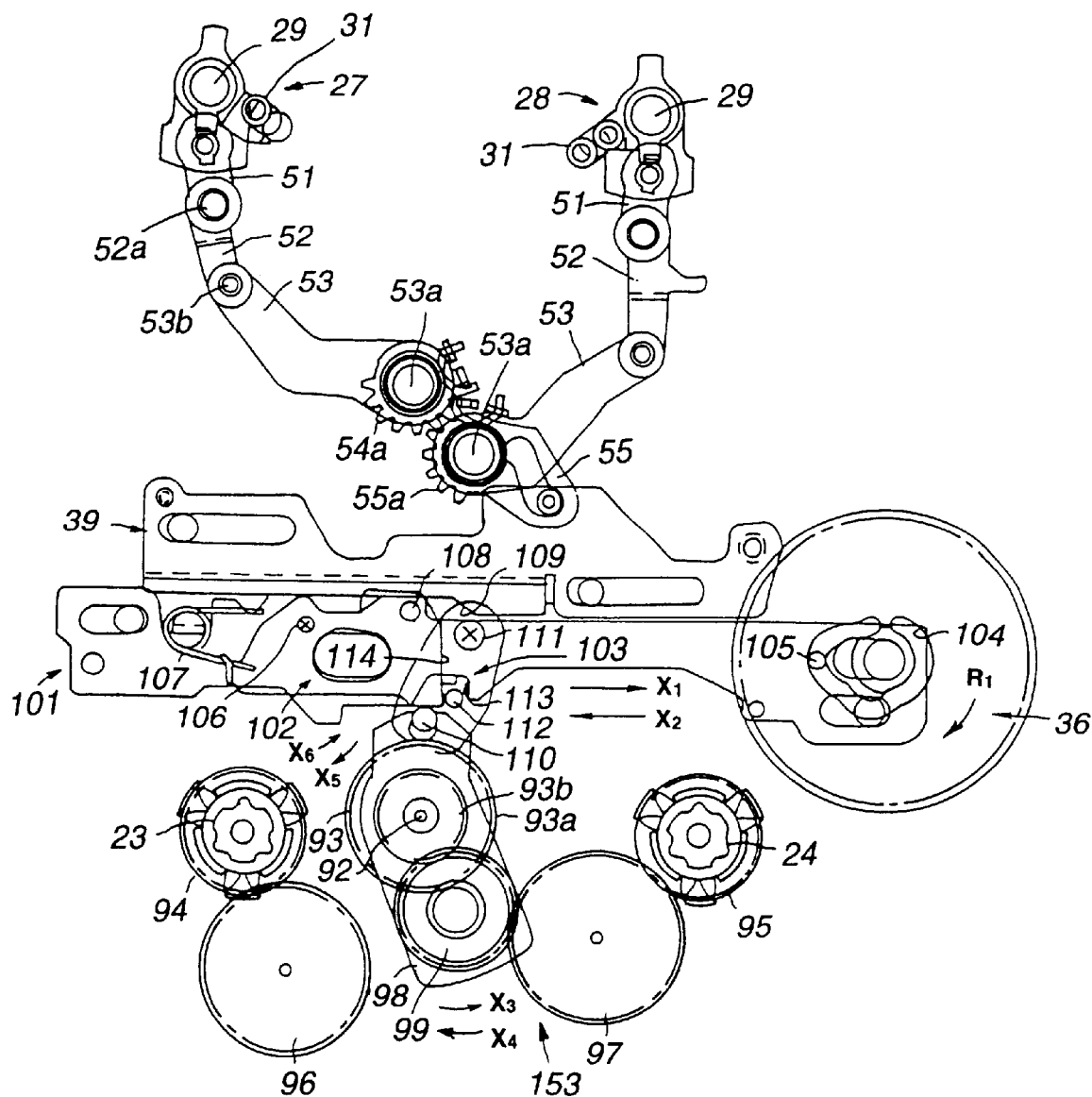
FIG. 11 is a plan view of the reel shaft selection unit showing the magnetic tape run at a constant velocity in the forward direction after being pulled out to the tape running route and wound about the rotary magnetic head device.

Referring to FIG. 11, the operational state of the tape recorder on selection of the recording and/or reproducing mode is now explained, in which the magnetic tape 7 is run from the stop mode in the forward direction of arrow S in FIG. 5 at a constant velocity as from the tape reel 23 towards the opposite side tape reel 24 for recording and/or reproducing information signals.

If the recording and/or reproducing mode in the forward direction of the tape recorder of the present invention is selected, the driving motor 34 is run in rotation for rotating the cam gear 36 via gear train 35 in the direction indicated by arrow $R_1$ in FIG. 1. At this time, the slider 39, connected to the cam gear 36 via the rotation actuating member 37a, keeps the magnetic tape 7 loaded on the tape running route, as shown in FIG. 11. Since the rotation actuating member 37a is maintained at this time in a state in which the engagement pin 47 is engaged in a concentric portion 46a of the cam groove 46, the rotation actuating member 37a is not rotated about the pivot 37b, even if the cam gear 36 is rotated in the direction indicated by arrow $R_1$ in FIG. 6. Since the rotation actuating member 37a is not rotated, the slider 39 of the reel shaft selection unit 153 is maintained in a state in which the magnetic tape 7 has been loaded on the tape running route. On the other hand, since the reel shaft selection slider 101 has the engagement pin 105 engaged in the second cam groove 104 of the cam gear 36, the engagement pin 105 is moved along the second cam groove 104, by rotation of the cam gear 36 in the direction indicated by arrow $R_1$ in FIG. 11, so that the reel shaft selection slider 101 is moved in the direction indicated by arrow $X_1$ in FIG. 11. When the reel shaft selection slider 101 is moved to the left-side end in FIG. 11, the rotary base block 98 is rotated from the intermediate position shown in FIG. 10 in the direction indicated by arrow $X_3$ in FIG. 11. The clutch gear 99 is engaged with the reel shaft driving gear 97 for rotating the rewind side reel shaft 24. As in the state shown in FIG. 10, the rotary lever 102 is kept in a state in which it has been rotated in the direction indicated by arrow $X_6$ in FIG. 11. At this time, the connection member 103 has the control pin 113 abutted against the end face of the rotary lever 102, while having its movement controlled by the recess 113. Thus, the connection member 103 is not rotated by movement of the reel shaft selection slider 101. The rotary base block 98 is rotated only by movement of the reel shaft selection slider 101.

If the magnetic tape 7 is run in the forward direction in the direction indicated by arrow S in FIG. 5, the winding diameter of the magnetic tape 7 on the tape reel 5 engaged with the takeup side reel shaft 24 is varied with the winding amount of the magnetic tape 7. If the amount of the magnetic tape 7 taken up on the take-up side tape reel 5 is increased, the magnetic tape 7 is taken up on the tape reel 5 at a higher velocity than the constant tape running speed by the capstan shaft 61, so that a tension more than is necessary is applied to the magnetic tape 7. Since the slip is produced at this time between the frictional members 124, 125 of the clutch gear 99 engaged with the reel shaft driving gear 97, such excess tension can be prevented from being applied to the magnetic tape 7. This applies for the case in which the magnetic tape 7 as later explained is run in the reverse direction.

Figure 12:
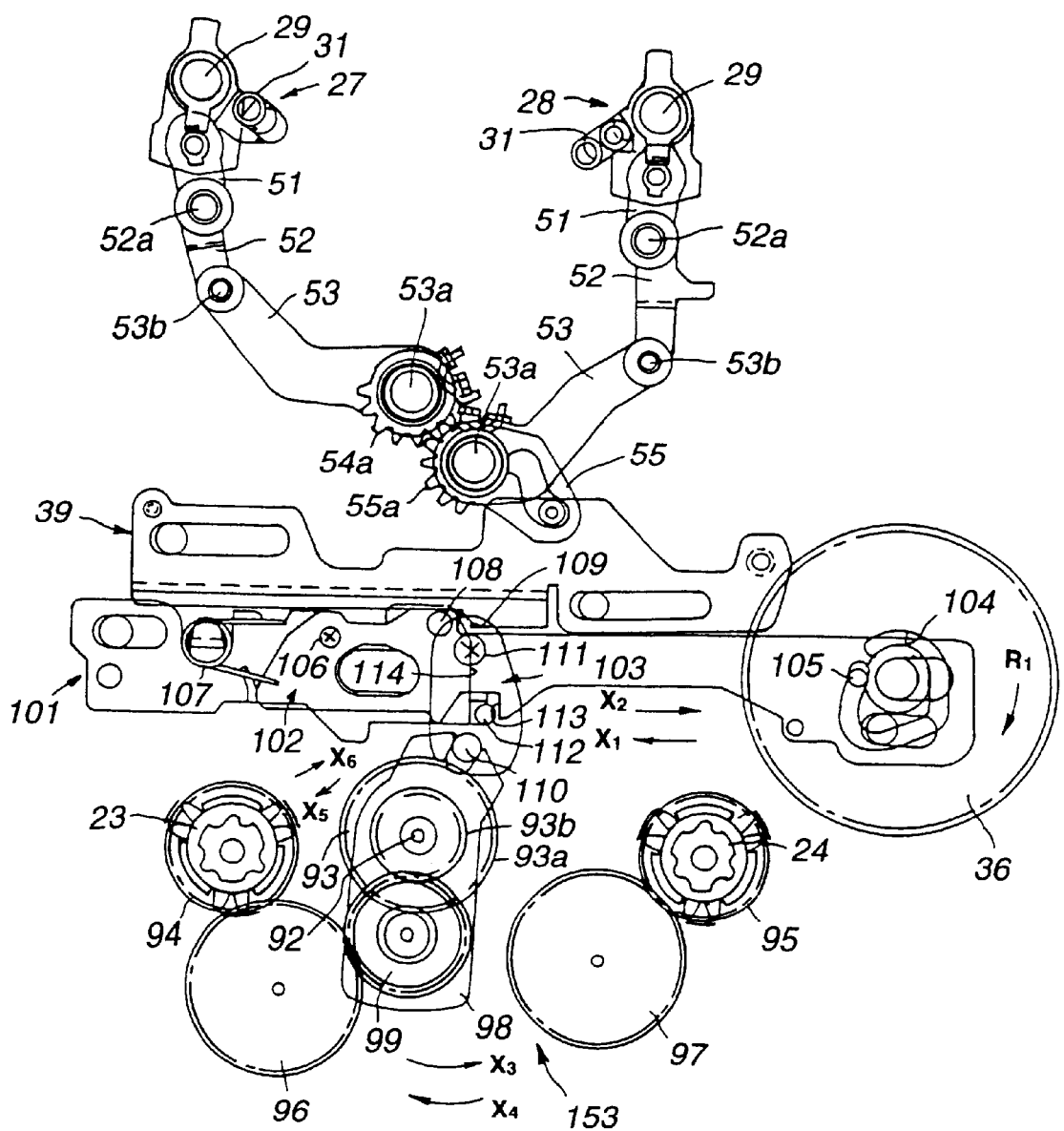
FIG. 12 is a plan view of the reel shaft selection unit showing the magnetic tape being run in the reverse direction.

Referring to FIG. 12, the operational state on selection of the reverse running mode in which the magnetic tape 7 is run from the opposite side tape reel 24 towards the tape reel 23 in the reverse direction indicated by arrow T in FIG. 5 for searching the information recorded on the magnetic tape 7 or rewriting the subcode, is explained.

If the running mode in the reverse direction of the tape recorder according to the present invention is selected, the driving motor 34 is run in rotation, so that the cam gear 36 is run in rotation by the driving motor 34 in the direction indicated by arrow $R_1$ in FIG. 12 via gear train 35. The slider 39 connected to the cam gear 36 via the rotation actuating member 37a keeps the magnetic tape 7 loaded on the tape running route, as shown in FIG. 12. Since the engagement pin 47 is kept engaged with the concentric portion 46a of the cam groove 46, the rotation actuating member 37a is not rotated about the pivot 37b even if the cam gear 36 is rotated in the direction indicated by arrow $R_1$ in FIG. 6. Since the rotation actuating member 37a is not rotated, the slider 39 constituting the reel shaft selection unit 153 is kept in the state of loading the magnetic tape 7 on the tape running route, as when the recording and/or reproducing mode of running the magnetic tape in the forward direction at the constant running velocity is selected, as described above. Since the engagement pin 105 is engaged in the second cam groove 104 of the cam gear 36, the engagement pin 105 is moved along the second cam groove 104 by rotation of the cam gear 36 in the direction indicated by arrow $R_1$ in FIG. 11, the reel shaft selection slider 101 being then moved in the direction indicated by arrow $X_2$ in FIG. 12. When the reel shaft selection slider 101 is moved up to the right-hand side end in FIG. 12, the clutch gear 99 is engaged with the reel shaft driving gear 96 for rotating the rotary base block 98 from the intermediate position shown in FIG. 10 in the direction indicated by arrow $X_4$ in FIG. 11 for rotating the supply side reel shaft 24. The rotary lever 102 is kept in the state in which the lever has been rotated in the direction indicated by arrow $X_6$ in FIG. 11 under the bias of the toggle spring 107, as in the state shown in FIG. 10. Since the control pin 113 compresses at this time against the end face of the rotary lever 102 and is simultaneously controlled in its movement by the recess 113, the connection member 103 is not rotated by movement of the reel shaft selection slider 101. The rotary base block 98 is rotated only by the movement of the reel shaft selection slider 101.

The state in which the running mode in the reverse direction has been selected is substantially equivalent to the state in which the magnetic tape 7 pulled out to the tape running route is taken up in the tape cassette 1 order to start the uploading. That is, the slider 39 and the reel shaft selection slider 101 are put in the positions shown in FIG. 11.

The unloading operation of taking up the magnetic tape 7 pulled out to the tape running route within the tape cassette 1 is explained with reference to FIG. 13.

Figure 13:
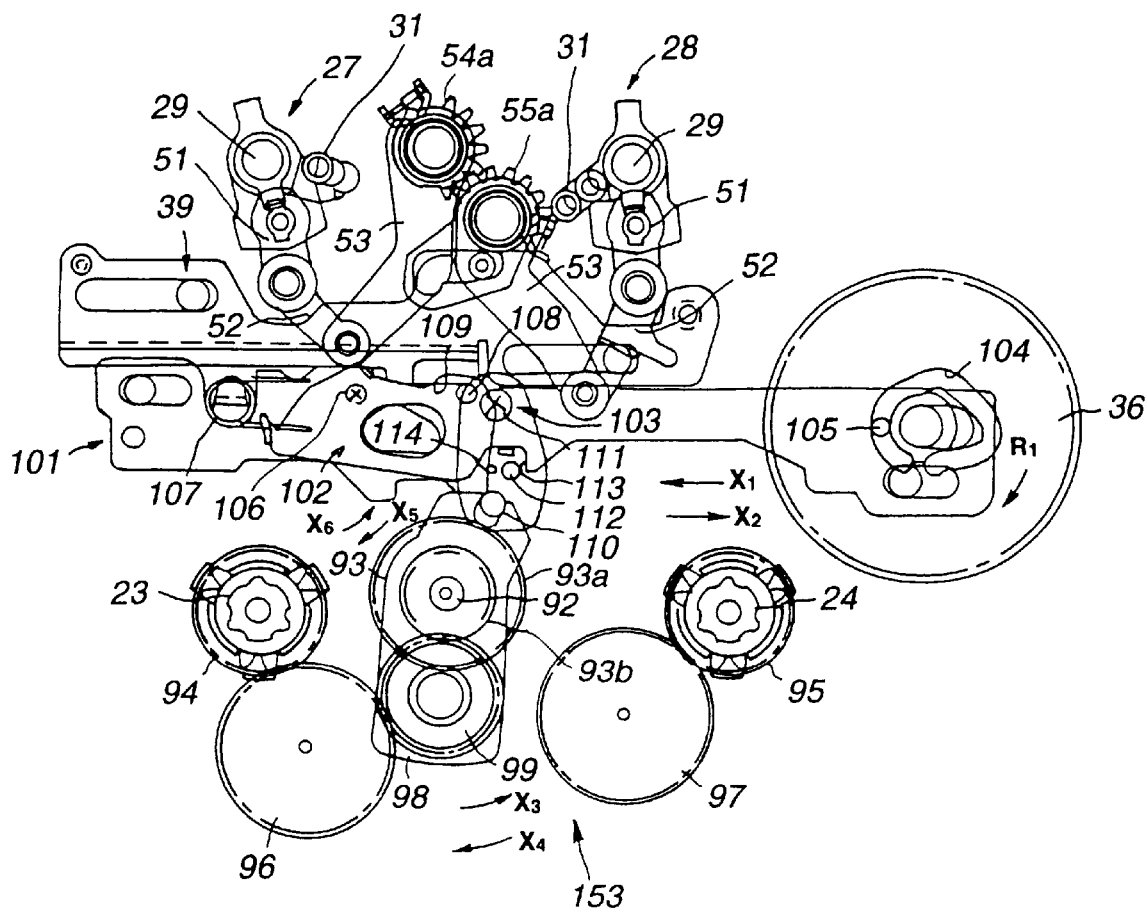
FIG. 13 is a plan view of the reel shaft selection unit showing the magnetic tape pulled out to the tape running route and taken up on the tape cassette.

For unloading, the driving motor 34 is run in rotation for rotating the cam gear 36 via gear train 35 in the direction indicated by arrow $R_1$ in FIG. 13. When the cam gear 36 is rotated in the direction indicated by arrow $R_1$ in FIG. 13, the engagement pin 47 of the rotation actuating member 37a engaged in the first cam groove 46 is moved from the concentric portion 46a to an offset portion 46b of the first cam groove 46 and is moved along this offset portion 46b to rotate the rotation actuating member 37a in the direction indicated by arrow G in FIG. 5.

When the rotation actuating member 37a is run in rotation in the direction indicated by arrow G in FIG. 5, the slider 39 connected to the rotation actuating member 37a is moved in the direction indicated by arrow $X_1$ in FIG. 13. At this time, the pinch roll supporting arm 63 connected via a link mechanism, not shown, to the cam gear 36, is rotated in a direction away from the capstan shaft 61 for moving the pinch roll 62 away from the capstan shaft 61 to release the clinching of the magnetic tape 7.

When the slider 39 is moved in the direction indicated by arrow $X_1$ in FIG. 13, the limiter plate 54 connected to the slider 39 is rotated in the direction opposite to that indicated by arrow B in FIG. 7 to rotate the opposite side third connecting arm 53 in the direction opposite to that indicated by arrow B. The limiter plate 54, having a gear 55a engaged in a gear portion 55b of the limiter plate 55, is rotated in timed relation to the limiter plate 55 in the direction opposite to the direction of arrow A in FIG. 7 for rotating the third connecting arm 53 in the direction opposite to the direction of arrow A.

When the paired third connection arms 53, 53 are rotated in the direction opposite to arrow B and in the direction opposite to arrow A in FIG. 7, the second connection arms 52, 52, connected to these third connection arms 53, 53, are rotated in the direction opposite to arrow B and in the direction opposite to arrow A in FIG. 7. The movable guide blocks 27, 28, supported by the distal ends of the first connection arms 51, 51, connected to the second connection arms 52, 52, are moved from the position laterally of the rotary magnetic head device 26 towards the cassette loading unit 22, under guidance by the movement guide grooves 32, 33, up to the position facing the spacing 17 of the tape cassette 1 loaded on the cassette loading unit 22.

At this time, the reel shaft selection slider 101 has been moved in the direction indicated by arrow $X_2$ in FIG. 13, as in the position shown in FIG. 12 associated with selection of the reverse running mode of running the magnetic tape 7 in the reverse direction. Since the reel shaft selection slider 101 has been moved in the direction indicated by arrow $X_2$ in FIG. 13, the rotary lever 102 has the thrust pin 108 thrust by the cam portion 109 of the slider 39 and hence is in the state of having been rotated in the direction indicated by arrow $X_5$ in FIG. 13. At this time, the control pin 112 is positioned in the opening 114 delimited by the end face of the rotary lever 102 and the recess 113 formed in the reel shaft selection slider 101 so as to be moved within the extent of the opening 114.

Since the reel shaft selection slider 101 is in a inoperative state, the rotary base block 98 is maintained in the state of having been rotated in the direction indicated by arrow $X_4$ in FIG. 13, so that the clutch gear 99 is kept engaged with the reel shaft driving gear 96.

Meanwhile, the capstan motor 25 continues to be rotated during the operation of unloading the magnetic tape 7 pulled out to the tape running route of the main body unit, so that the tape supply side reel shaft 23 is rotated via the driving power transmission unit 152, in order to take up the magnetic tape 7 on the supply side tape reel 6.

If, during the unloading of the magnetic tape 7, the takeup speed on the supply side tape reel 6 is deviated from the movement speed of the first and second movable guide blocks 27, 28 to apply a large tension on the magnetic tape 7, there is produced a slip between the frictional members 124, 125 to prevent a large tension from being applied to the magnetic tape 7.

The operation in which the magnetic tape 7 is taken up in the tape cassette 1, the cassette holder holding the tape cassette 1 is moved in a direction away from the cassette loading unit 22, the tape cassette is ejected, and a new tape cassette 1 is held in the cassette holder and loaded on the cassette loading. unit 22 by way of loading the magnetic tape 7, is hereinafter explained.

When the tape cassette 1 previously loaded on the cassette loading unit 22 has been taken out, the rotary lever 102 constituting the reel shaft selection unit 153 has been rotated in the direction indicated by arrow $X_5$ in FIG. 13, with the thrust pin 108 being thrust against the cam portion 109 of the slider 39 and rotated in the direction indicated by arrow $X_5$ in FIG. 13, such that the control pin 112 is movable within the extent of the opening 114 delimited by the end face of the rotary lever 102 and the recess 113 formed in the reel shaft selection slider 101.

If the capstan motor 25 is run in rotation, the clutch gear 99 is run in rotation via the driving power transmission unit 152, so that the rotary base block 98 is rotated in the direction indicated by arrow $X_3$ in FIG. 13, about the pivot 92 as the center of rotation, from the state in which the clutch gear 99 meshes with the reel shaft driving gear 96 to the neutral position in which the clutch gear is engaged with none of the reel shaft driving gears 96, 97, as shown in FIG. 9. By the rotation of the rotary base block 98 under the driving power of the capstan motor 25 from the position of meshing with the reel shaft driving gear 96 to the neutral position, the magnetic tape 7 is pulled out from the tape cassette 1 loaded in the cassette loading unit 22 so as to be extended on the tape running route in the main body unit and taken up on the tape guide drum of the rotary magnetic head device 26, by way of tape loading, as shown in FIG. 9.

Since the magnetic tape 7 can be switched from the unloading state to the loading state for the magnetic tape 7 simply by rotating the rotary base block 98 by the capstan motor 25 without employing the reel shaft selection unit 153 made up of the cam gear 36, slider 39 and the reel shaft selection slider 101, prompt tape loading can be achieved. Moreover, since the first and second cam grooves 46, 104 provided in the cam gear 36 controlling the movement of the slider 39 and the reel shaft selection slider 101 can be simplified in structure, the operating mode of the tape recorder can be switched promptly.

Figure 14:
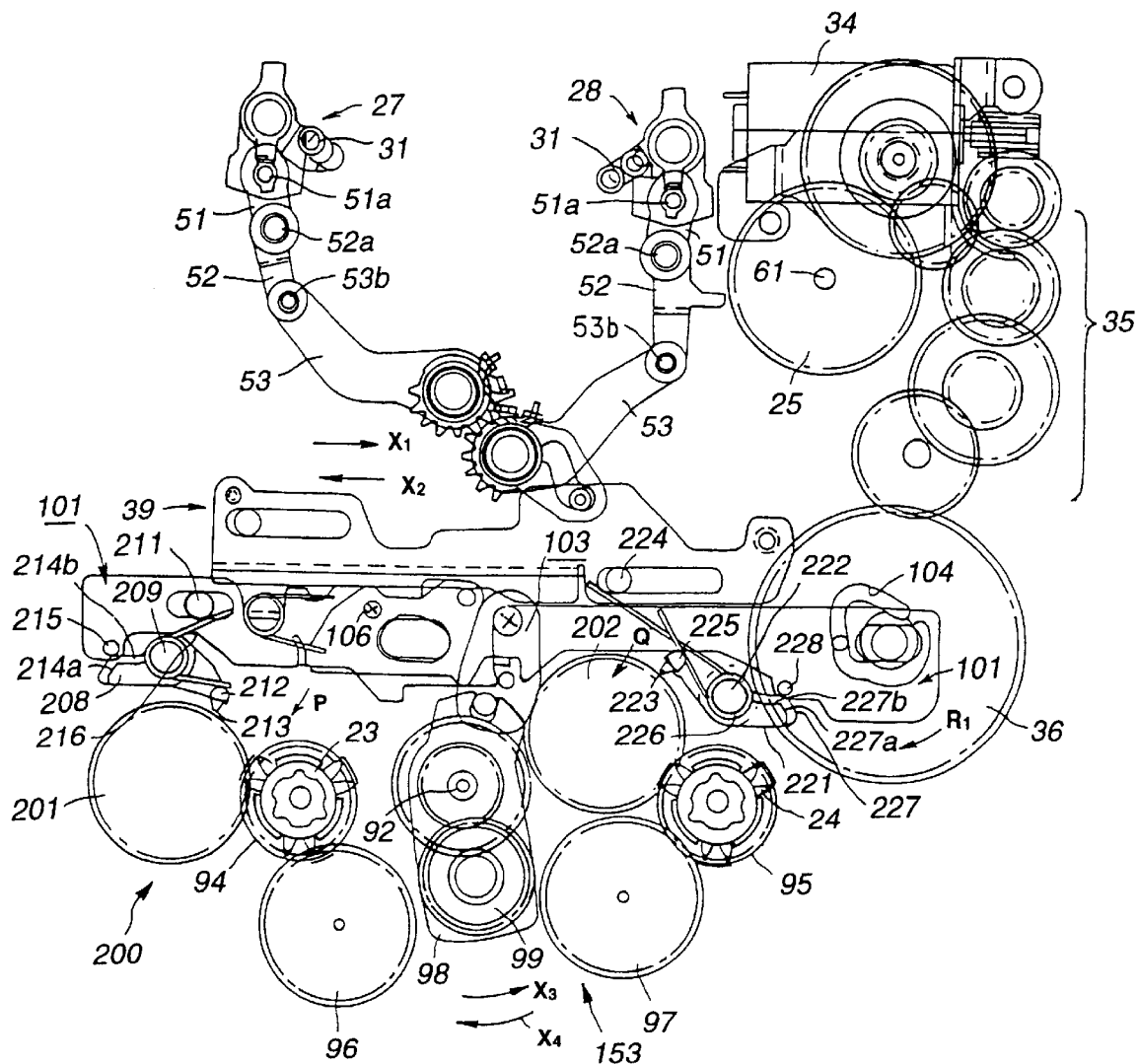
FIG. 14 is a plan view of the rotary magnetic head type tape recorder provided with a tape tension according unit adapted for according back tension to the running magnetic tape.

Referring to FIG. 14, a tape recorder of the rotary magnetic head system, provided with a tensioning mechanism 200 for imparting back tension to the magnetic tape 7 run in the forward or reverse direction is explained.

In the tape recorder of the rotary magnetic head system, parts or components similar to those of the above-described tape recorder of the rotary magnetic head system are denoted by the same reference numerals and are not explained specifically.

Referring to FIG. 14, the tensioning mechanism 200 includes a first clutch gear 201 meshing with the reel shaft gear 94 adapted for rotating the supply side reel shaft 23 for imparting back tension to the magnetic tape 7 and a second clutch gear 202 meshing with the reel shaft gear 95 adapted for rotating the take-up side reel shaft 24 for imparting back tension to the magnetic tape 7.

Figure 15:
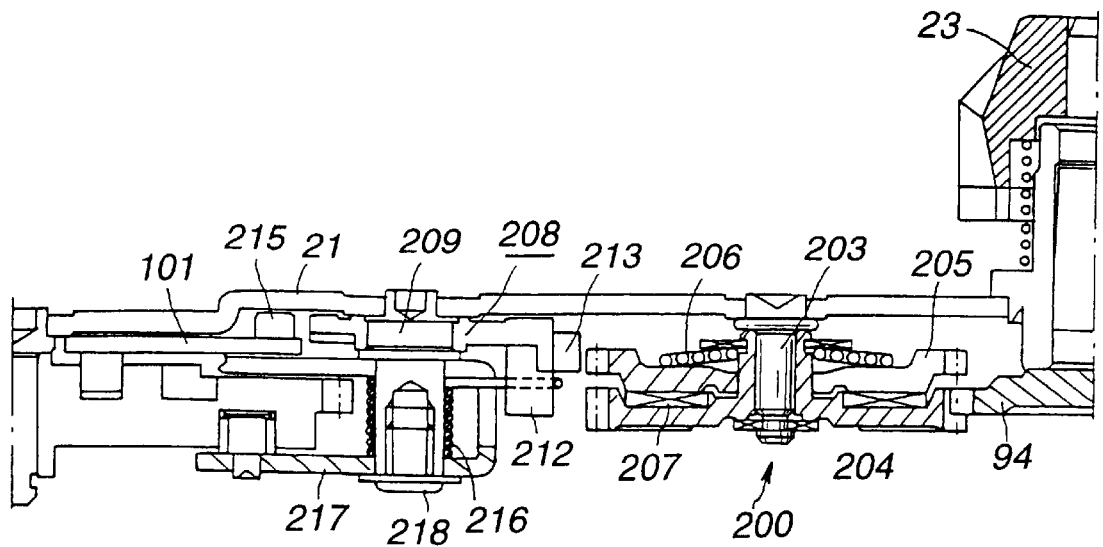
FIG. 15 is a cross-sectional of a tension according unit adapted for according back tension to the running magnetic tape.

Referring to FIG. 15, the first gear 201 has a first gear portion 204 carried by a shaft 203 set on the base 21 and a second gear portion 205 mounted coaxially with the first gear portion 204. Between the first gear portion 204 and the base 21 is installed a thrusting spring 206 thrusting the second gear portion 205, towards the first gear portion 204. Between the first gear portion 204 and the second gear portion 205 is arranged a frictional member 207 having a high frictional coefficient, such as felt. That is, the second gear portion 205 is thrust by the thrusting spring 206 under the biasing force towards the first gear portion 204 so that the frictional member 107 is brought into pressure contact with the first gear portion 204. The first gear portion 204 meshes with the supply side reel gear 94.

The second gear portion 205 is selectively engaged by a first lock lever 208 adapted for locking the rotation of the first clutch gear 201. The first lock lever 208 is rotatably carried by a pivot 209 set on the base 21, as shown in FIGS. 14 and 15. The first lock lever 208 carries, on its distal end, a retention portion 213 retained by the second gear portion 205 of the first lock lever 208. The first lock lever 208 is biased in the direction indicated by arrow P in FIG. 14, that is in a direction towards the first gear portion 205 of the first clutch gear 201, by a torsion coil spring 216 having one end retained by a guide shaft 211 adapted for guiding the movement of the reel shaft selection slider 101 and having its other end retained by a retention lug 212 provided on the first lock lever 208.

On the proximal end of the first lock lever 208 is provided a cam portion 214 made up of an inclined surface section 214*a* and a horizontal surface section 214*b*. On this cam portion 214 is abutted a first control lug 215 set on one surface of the reel shaft selection slider 101. That is, the first lock lever 208 is inhibited in rotation in the direction indicated by arrow P in FIG. 14 when the first control lug 215 is abutted against the horizontal surface section 214*b*, while it is rotated in the direction indicated by arrow P in FIG. 14 so as to be retained by the second gear portion 205 of the first clutch gear 201 when the first control lug 215 is abutted against the inclined surface section 214*a*. When inhibited in rotation by the first lock lever 208, the first clutch gear 201 causes the slip to be produced between the frictional member 207 and the first and second gears 204, 205 to apply a load on the reel shaft 94 meshing with the first gear portion 204.

The first lock lever 208 is mounted on the base 21 by a screw 218 using a mounting member 217.

The second clutch gear 202 meshes with a reel shaft gear 95 adapted for rotating the take-up side reel shaft 24. The second clutch gear 202 is the same in structure as the above-described first clutch gear 201 and hence is not explained specifically.

The second clutch gear 202 is selectively engaged by a second lock lever 221 adapted for locking the rotation of the second clutch gear 202. The second lock lever 221 is rotatably carried by a pivot 222 set on the base 21, as shown in FIG. 14. The second lock lever 221 carries, on its distal end, a retention portion 223 retained by the second gear portion 205 of the second clutch gear 202.

The second lock lever 221 is biased towards the second clutch gear 202, that is in the direction indicated by arrow Q in FIG. 14, by a torsion coil spring 226 having its one end retained by a guide shaft 224 adapted for guiding the movement of the slider 39 and having its other end retained by a retention lug 225 provided on the second lock lever 221. On the proximal end of the second lock lever 221 is provided a cam portion 227 made up of an inclined surface section 227*a* and a horizontal surface section 227*b*. This cam portion 227 is abutted by a second control lug 228 set on the opposite side of the reel shaft selection slider 101. That is, the second lock lever 221 is inhibited in rotation in the direction indicated by arrow Q in FIG. 14 when the second control lug 228 is abutted against the horizontal surface section 227*b*, while it is rotated in the direction indicated by arrow Q in FIG. 14 so as to be retained by the second gear portion 202 when the second control lug 228 is abutted against the inclined surface section 227*a*. When inhibited in rotation by the second lock lever 221, the second clutch gear 202 causes the slip to be produced between the frictional member 207 and the first and second gears 204, 205 to apply a load on the reel shaft 95 meshing with the first gear portion 204.

The above-described tensioning mechanism 200 operates as follows:

In the loading start state in which the magnetic tape 7 is pulled out and extended on the pre-set tape running route, as shown in FIG. 9, the reel shaft selection slider 101 has been moved in the direction indicated by arrow $X_2$ in FIG. 9. At this time, the first lock lever 208 is in such a state in which the control lug 215 provided on one side of the reel shaft selection slider 101 is abutted against the horizontal surface section 214*b* of the cam portion 214 so as to be separated away from the first clutch gear 201.

The second lock lever 221 is in such a state in which the control lug 228 provided on the opposite side of the reel shaft selection slider 101 is abutted against the inclined surface section 227*a* of the cam portion 227 and is rotated under the bias of the torsion coil spring 226 towards the second clutch gear 202 into engagement with the second clutch gear 202. That is, the supply side first clutch gear 201 is enabled to be rotated without being locked by the first lock lever 208 to enable rotation of the reel shaft gear 94 meshing with the first clutch gear 201.

With the movable guide block movement actuating unit 151, if the driving motor 34 is run in rotation, the cam gear 36 is run in rotation via gear train 35, so that the slider 39 is moved via rotation actuating member 37*a*, as shown in FIGS. 4 and 5. When the slider 39 is moved, the limiter plate 55, having the cam opening 57 engaged by the supporting pin 58 provided on the slider 39, is rotated about the pivot 53*a* as the center of rotation. By rotation of the limiter plate 55, the limiter plate 54, having the gear 54*a* meshing with the gear portion 55*a* of the limiter plate 55, is rotated in the opposite direction to the direction of rotation of the limiter plate 55, with the pivot 53*a* as the center of rotation. The first and second movable guide blocks 27, 28 are moved via the first to third connection arms 51 to 53, under guidance by the movement guide grooves 32, 33, between the position facing the spacing 17 of the tape cassette 1 loaded on the cassette loading unit 22 as shown in FIG. 4 and the position corresponding to the loading end position of the magnetic tape 7 laterally of the rotary magnetic head device 26 as shown in FIG. 5. This pulls the magnetic tape 7 in the tape cassette 1 from the tape cassette 1 so as to be wound about the tape guide drum of the rotary magnetic head device 26, as shown in FIG. 5.

When the running of the magnetic tape 7 about the tape guide drum of the rotary magnetic head device 26 ceases, the reel shaft selection slider 101 is put at an intermediate position of movement in the direction indicated by arrow $X_1$ in FIG. 10. At this time, the first lock lever 208 is spaced apart from the first clutch gear 201, because the control lug 215 provided on one lateral side of the reel shaft selection slider 101 is abutted against the horizontal surface section 214b of the cam portion 214. The second lock lever 221 is spaced apart from the second lock lever 221 because the control lug 228 provided on the opposite side of the reel shaft selection slider 101 is abutted against the horizontal surface section 227b of the cam portion 227.

If the fast feed mode or the rewind mode is selected, and the capstan motor 34 is run in rotation, the rotary base block 98 is rotated in the direction indicated by arrow $X_3$ or $X_4$ in FIG. 10, depending on the direction of rotation of the capstan motor 34, so that the clutch gear 99 is selectively engaged with one of the reel shaft driving gears 96, 97 to run the magnetic tape 7 at an elevated velocity in the forward or reverse direction. The magnetic tape 7 is taken up on the takeup side tape reel 6 or on the supply side tape reel 5. Since the reel shaft selection unit 153 again is not in operation, the first lock lever 208 nor the second lock lever 221 is engaged with the second gear portions 205, 205 of the first clutch gear 201 and the second clutch gear 202, with the reel shaft gears 94, 95 being enabled to be rotated to enable high-speed running of the magnetic tape 7.

If, from the stop mode, the recording and/or reproducing mode, in which the magnetic tape 7 is run in the forward direction, that is from the supply side tape reel 5 towards the takeup moved side tape reel 6 for recording and/or reproducing information signals, the reel shaft selection slider 101, having the engagement pin 105 engaged in the second cam groove 104 of the cam gear 36, is moved in the direction indicated by arrow $X_2$ in FIG. 11, by the engagement pin 105 being moved along the second cam groove 104 with rotation in the direction of arrow $R_1$ in FIG. 11 of the cam gear 36, as shown in FIG. 11.

At this time, the first lock lever 208 is rotated under the bias of the torsion coil spring 216 in the direction indicated by arrow P in FIG. 14, by the control lug 215 on one side of the reel shaft selection slider 101 abutted against the inclined surface section 214a of the cam portion 214, the retention portion 213 then engaging with the second gear portion 205 of the first clutch gear 201. The second lock lever 221 is spaced apart from the second clutch gear 202 by the control lug 228 on the opposite side of the reel shaft selection slider 101 abutted against the horizontal surface section 227b of the cam portion 227.

If, in this state, the magnetic tape 7 is run at a constant velocity in the forward direction, the first clutch gear 201 has the first gear portion 204 rotated with rotation of the reel shaft gear 94 and has the second gear portion 205 locked against rotation by the first lock lever 208, so that a slip is generated between the first gear portion 204 and the second gear portion 205 to generate a pre-set load. Thus, when the magnetic tape 7 is taken up on the takeup side tape reel 6, it is run with a back tension and taken up on the tape reel 6 in a trim winding state on the tape reel 6 without producing slack during rewinding.

It is assumed that the magnetic tape 7 is run in reverse, that is from the takeup side tape reel 6 towards the supply side tape reel 23. In this case, since the reel shaft selection slider 101 has the engagement pin 105 engaged in the cam groove 104 of the cam gear 36, the engagement pin 105 is moved along the second cam groove 104 in the direction indicated by arrow $X_2$ in FIG. 12 by the rotation of the cam gear 36 in the direction indicated by arrow $R_1$ in FIG. 12. At this time, since the first lock lever 208 is spaced apart from the first clutch gear 201, because the control lug 215 provided on one side of the reel shaft selection slider 101 compresses against the horizontal surface section 214b of the cam portion 214, as shown in FIG. 14. On the other hand, since the control lug 228 provided on the other side of the reel shaft selection slider 101 compresses against the inclined surface section 227a of the cam portion 227, the second lock lever 221 is rotated in the direction indicated by arrow Q in FIG. 14, under the bias of the torsion coil spring 226, so that the retention portion 223 is engaged with the second gear portion 205 of the second clutch gear 202.

If, in this state, the magnetic tape 7 is run at a constant velocity in reverse, the second clutch gear 202 has the first gear portion 204 rotated with rotation of the reel shaft gear 95 and has the second gear portion 205 locked against rotation by the second lock lever 221, so that a slip is generated between the first gear portion 204 and the second gear portion 205 to generate a pre-set load. Thus, when the magnetic tape 7 is taken up on the supply side tape reel 23, it is run with a back tension and taken up on the tape reel 6 in a trim winding state on the tape reel 5 without producing slack during rewinding.

When taking up the magnetic tape 7 pulled out on the tape running route into the tape cassette 1 to start unloading, the reel shaft selection slider 101 has been moved in the direction indicated by arrow $X_2$ in FIG. 12, as shown in FIG. 13. Thus, the retention portion 213 of the first lock lever 208 is not engaged with the second gear portion 205 of the first clutch gear 201, while the retention portion 223 of the second lock lever 221 is engaged with the second gear portion 205 of the first clutch gear 201. If, in this state, the driving motor 34 is run in rotation, the cam gear 36 of the movable guide block movement actuating unit 151 is run in rotation via gear train 35, as shown in FIGS. 4 and 5, so that the slider 39 is moved via rotation actuating member 37a. If the slider 39 is moved, the limiter plate 55, having the cam opening 57 engaged by the supporting pin 58 provided on the slider 39, is rotated about the pivot 53a as center. By rotation of the limiter plate 55, the limiter plate 54, provided with the gear portion 54a meshing with the gear portion 55a provided on the limiter plate 55, is rotated in the opposite direction to the direction of rotation of the limiter plate 55, about the pivot 53a as the center of rotation. The first and second movable guide blocks 27, 28 are moved via the first to third connection arms 51 to 53, under guidance by the movement guide grooves 32, 33, from the position corresponding to the loading end position of the magnetic tape 7 laterally of the rotary magnetic head device 26 to the position facing the spacing 17 of the tape cassette 1 loaded on the cassette loading unit 22, as shown in FIG. 4 and as shown in FIG. 5. The magnetic tape 7 is taken up on the tape reel 5 by the capstan motor 25 being run in rotation to rotate the reel shaft driving gear 96 meshing with the clutch gear 99 via the driving power transmission unit 152 to cause rotation of the reel shaft 23.

Figure 16:
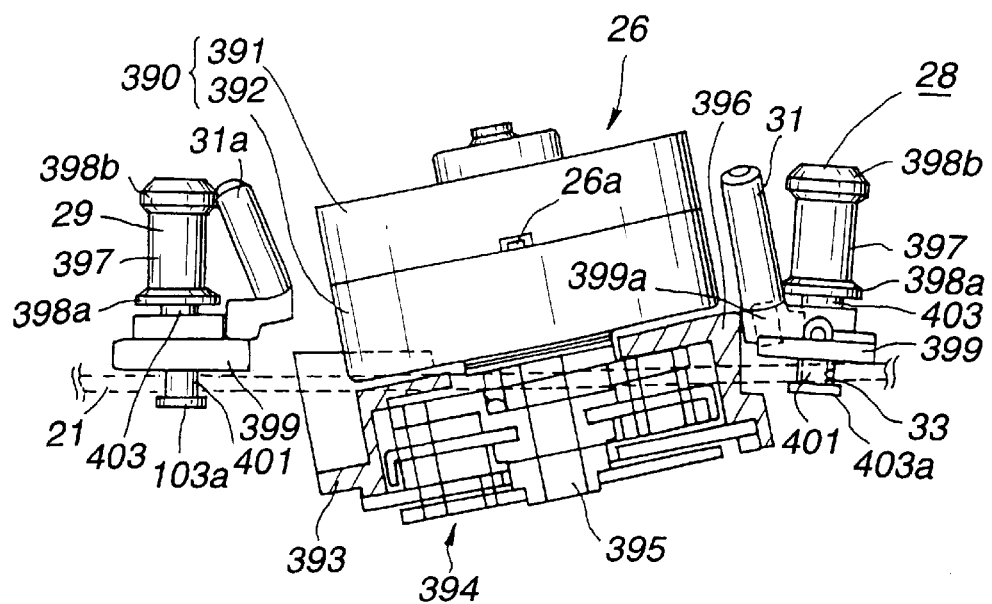
FIG. 16 is a side view of the rotary magnetic head device and first and second movable guide blocks.

The rotary magnetic head device 26, used for the tape recorder, includes a tape guide drum 390 made up of a rotary drum 391 and a fixed drum 392, and a head driving motor 394 adapted for rotationally driving the rotary drum 391, as shown in FIG. 16. The rotary drum 391 carries a rotary magnetic head 26a, while the fixed drum 392 is arranged coaxially with and below the rotary drum 391. The rotary drum 391 and the fixed drum 392 are in the form of cylinders of approximately the same diameter.

In the rotary magnetic head device 26, a supporting base block 393 is mounted on the base 21, on the upper surface of which the tape running route for the magnetic tape 7 is formed, or on the main body unit of the tape recorder, with a pre-set angle of inclination to the base 21. The fixed drum 392 of the tape guide drum 390 and the head driving motor 394 are mounted on the upper surface and on the lower surface of the supporting base block 393, respectively. When the head driving motor 394 is mounted on the supporting base block 393, the distal end of the driving shaft 395 is passed through the fixed drum 392 so as to be protruded on the upper surface of the supporting base block 393. The rotary drum 391 is mounted as-one on the distal end of the driving shaft 395 protruded on the upper surface side of the supporting base block 393 and is run in rotation along with the rotary magnetic head 26a by rotation of the head driving motor 394.

Figure 17:
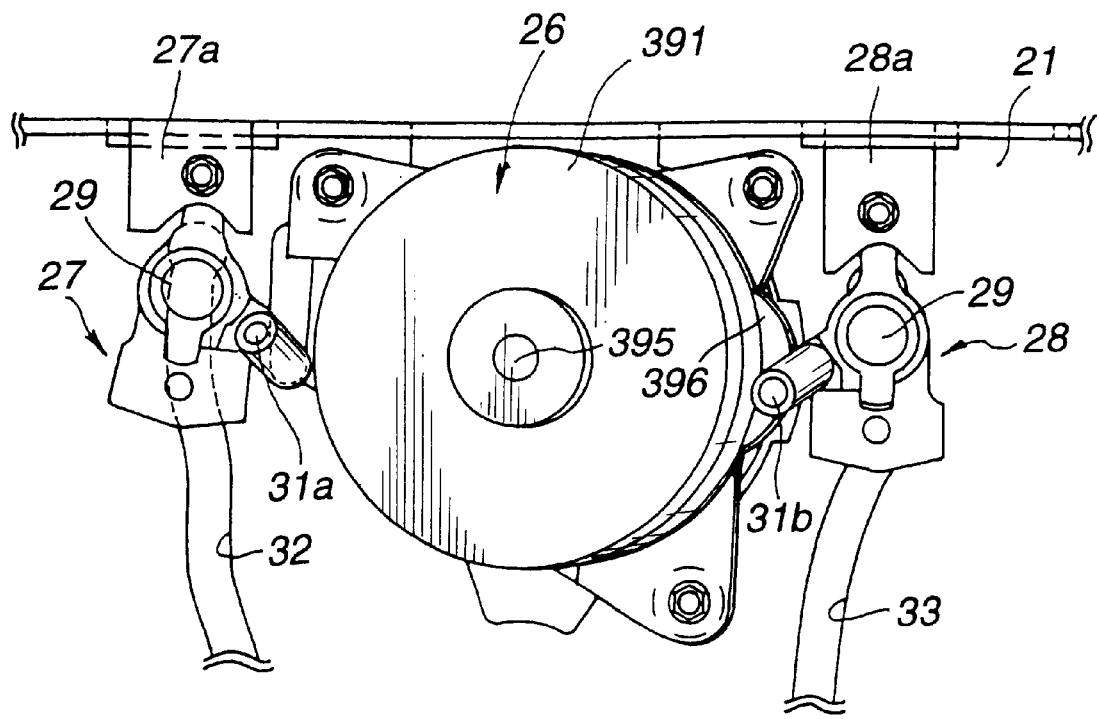
FIG. 17 is a plan view of the rotary magnetic head device and first and second movable guide blocks.

The rotary magnetic head device 26, thus mounted on the base 21 or on the main body unit of the tape recorder with a tilt relative to the base 21, is mounted in the main body unit so that the driving shaft 395 of the head driving motor 394 is inclined relative to the base 21, as shown in FIGS. 16 and 17.

The magnetic tape 7, pulled out from the tape cassette 1, is wound on the outer periphery of the tape guide drum 390 over an angle of 160° as described above. Since the tape guide drum 390 is arranged with a angle relative to the magnetic tape 7 running on the tape running route, the magnetic tape 7 is wound spirally on the outer periphery of the tape guide drum 390.

The rotary magnetic head 23a is mounted on the rotary drum 392 so that its distal end having a magnetic gap is slightly protruded from the outer peripheral surface of the tape guide drum 390.

The rotary drum 392 is rotated as the magnetic tape 7 spirally wound about the tape guide drum 390 and clinched between the capstan shaft 61 and the pinch roll 62 is run at a constant velocity so that the magnetic tape 7 is brought into relative sliding contact with the rotary magnetic head 23a for forming a recording track inclined relative to the longitudinal direction of the magnetic tape 7 for recording information signals or reproducing information signals recorded on the recording track.

Meanwhile, the magnetic tape. 7 is pulled out from the tape cassette 1 so as to run parallel to the upper surface of the base 21 in order to be spirally wound on the outer peripheral surface of the tape guide drum 90. Therefore, at least first and second inclined guide pins 31a, 31b, provided on the first and second movable guide blocks 27, 28 adapted for guiding the magnetic tape 7 running parallel to the base 21 so as to be wound spirally about the tape guide drum 90 arranged at an angle to the base 21, are mounted at an angle to the base 21.

The specified structure of the first and second movable guide blocks 27, 28 are hereinafter explained.

The first and second movable guide blocks 27, 28 are provided with a movable base blocks 399 carried by the distal ends of first connection arms 51, 51 making up the movable guide block movement actuating unit 151 and which are moved between a position towards the cassette loading unit 22 and a position laterally of the rotary head device 26 under guidance by the first and second movement guide grooves 32, 33.

The movable base block 399 has a tubular movement guide shafts 401 on its lower surface and is mounted on the base 21 by having the movement guide shafts 401 inserted in the first and second movement guide grooves 32, 33. The movable base block 399 is moved between the position towards the cassette loading unit 22 and the position laterally of the rotary head device 26 under guidance by the first and second movement guide grooves 32, 33.

The guide roll 29 is set on the movable base block 399 and includes a roll 397 rotatably inserted in a pivot 403 set on the movable base block 399 so that its proximal end is passed through the movement guide shafts 401. On this roll 397 is wound the magnetic tape 7. The proximal end of the pivot 403 is formed as-one with a lower flange 398a, while the upper end thereof carries an upper side flange 398b. The magnetic tape 7, run around the roll 397, has upper and lower side edges guided by a lower flange 398a and an upper side flange 398b for controlling the winding position on the roll 397.

The movable base block 399 is supported on the base 21 in a manner safeguarded against incidental extrication from the first and second movement guide grooves 32, 33 by an anti-extrication member 403a mounted on the tip of the proximal end thereof for securing the pivot 403 inserted into the movement guide shafts 401 to the movement guide shafts 401.

The guide roll 29 is mounted upright on the base 21 because the pivot 403 supporting the roll 397 is supported at right angles to the movable base block 399.

The first and second inclined guide pins 31a, 31b are mounted via a pin mounting portion 399a provided on the movable base block 399. The first inclined guide pin 31a mounted on the movable base block 399 so that, when the first movement guide block 27 is moved to a position of loading the magnetic tape 7 positioned laterally of the rotary magnetic head device 26 on the tape running route, the first inclined guide pin 31a is inclined towards the guide roll 29 which is the direction of inclination of the rotary magnetic head device 26. The second inclined guide pin 31b provided on the second movement guide block 28 is mounted on the movable base block 399 with a tilt so that, when the second movement guide block 28 has moved the magnetic tape 7 positioned laterally of the rotary magnetic head device 26 to the position of loading the tape on the tape running route, the second inclined guide pin 31b is levelled down towards the rotary magnetic head device 26, as shown in FIG. 16. Specifically, since the role of the second inclined guide pin 31b provided on the second movement guide block 28 is to guide the magnetic tape 7, running from the lower side towards the upper side of the tape guide drum 390 at the exit side of the tape guide drum 390 in a reversed manner as shown in FIG. 5 to a parallel path to the base 21, the second inclined guide pin 31b is mounted with a tilt on the movable base block 399 so as to level down towards the rotary magnetic head device 26.

For reducing the size of the tape recorder, it is necessary to reduce the separation between paired first and second movable guide blocks 27, 28 to as small a value as possible. If the separation between the paired first and second movable guide blocks 27, 28 is reduced, the separation from the rotary magnetic head device 26 is also reduced, so that, when the first and second movable guide blocks 27, 28 are moved towards the rotary magnetic head device 26, there is a risk of collision of the second inclined guide pin 31b, tilted towards the rotary magnetic head device 26, against the tape guide drum 390, if the second inclined guide pin 31b is collided against the tape guide drum 390, not only can the magnetic tape 7 not be wound on the outer periphery of the tape guide drum 390, but also the rotary magnetic head device 26 inclusive of the tape guide drum 390 or the magnetic tape 7 is likely to be destroyed. Therefore, the first and second movable guide blocks 27, 28 need to be mounted with a separation so as to free of collision with the rotary magnetic head device 26. However, if the separation between the first and second movable guide blocks 27, 28 and the rotary magnetic head device 26 is increased, the tape recorder cannot be reduced in size.

The tape recorder according to the present invention is aimed at resolving the above-mentioned problem to reduce the size of the tape recorder further.

With the tape recorder according to the present invention, the magnetic tape 7 can be wound over a pre-set angle on the tape guide drum 390, as the collision of the second inclined guide pin 31b against the tape guide drum 390 is controlled, despite the fact that the second movement guide block 28 having the second inclined guide pin 31b inclined towards the rotary magnetic head device 26 has a trajectory of contacting with the tape guide drum 390 in the course of movement of the second movement guide block 28 towards the rotary magnetic head device 26.

Figure 18:
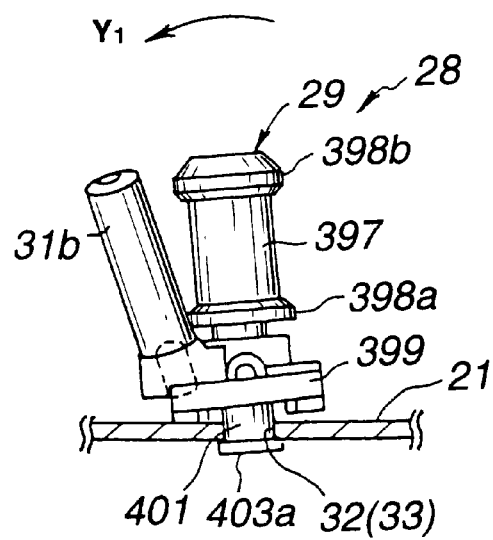
FIG. 18 is a side view showing the second movable guide block tilted in one direction.
Figure 19:
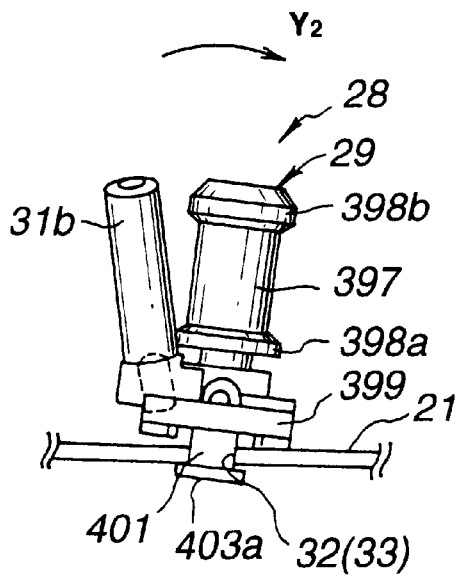
FIG. 19 is a side view showing the second movable guide block tilted in the other direction.

The second movement guide block 28 having the second inclined guide pin 31b inclined for levelling down towards the rotary magnetic head device 26 is supported so that it can be tilted a pre-set angle relative to the base 21 in a direction indicated by arrow $Y_1$ in FIG. 18 or in a direction indicated by arrow $Y_2$ in FIG. 19. That is, the second movement guide block 28 can be tilted relative to the base 21 by providing an allowance between the movement guide shafts 401 adapted for supporting the second movement guide block 28 on the base 21 and the second movement guide groove 33 into which is inserted the movement guide shafts 401.

The rotary magnetic head device 26 is provided with a thrusting portion 396 for clearing the second movement guide block 28 from the rotary magnetic head device 26 when the second movement guide block 28 is moved to close to the rotary magnetic head device 26, with the second inclined guide pin 31b colliding against the tape guide drum 390. This thrusting portion 396 is formed so that a portion of the supporting base block 93 is protruded towards the movement trajectory of the second movement guide block 28, as shown in FIGS. 16 and 17.

Since the second movement guide block 28 is supported with a tilt relative to the base 21, and the rotary magnetic head device 26 is provided with the thrusting portion 396, the movable base block 399 compresses against the thrusting portion 396 when the second movement guide block 28 is moved towards the rotary magnetic head device 26 and the second inclined guide pin 31b collides against the tape guide drum 390. When the movable base block 399 is moved from the position compressing against the thrusting portion 396 in a direction towards the lateral side of the rotary magnetic head device 26, the second inclined guide pin 31b is inclined in a direction in which the second inclined guide pin 31b is spaced apart from the tape guide drum 390 so that the second movement guide block 28 is moved in a state in which the second inclined guide pin 31b is prevented from colliding against the tape guide drum 390.

The second movement guide block 28, tilted by the thrusting portion 396, is further moved and released from the thrusting by the thrusting portion 396 so as to be tilted towards the rotary magnetic head device 26. However, the second inclined guide pin 31b reaches a position sufficiently spaced apart from the tape guide drum 390 and hence is not contacted with the tape guide drum 390.

Similarly to the second movement guide block 28, the first movement guide block 27 is supported at an angle relative to the base 21, so that it can be moved easily through the first inclined guide groove 32, having a curved mid portion, and hence the magnetic tape 7 can be reliably loaded/unloaded by the first and second movable guide blocks 27, 28.

When reaching the tape loading complete position in which the magnetic tape 7 is wound about the tape guide drum 390, the first and second movable guide blocks 27, 28, tiltably supported by the base 21, are set to a controlled tilt position by the movable base blocks 399, 399 engaging in the positioning members 27a, 28a provided on the base 21. With the movable base blocks 399, 399, positioned in this manner, the first and second movable guide blocks 27, 28 can correctly guide the running direction of the magnetic tape 7 by the guide roll 29 and the inclined guide pins 31a, 31b in order to take up the magnetic tape 7 around the tape guide drum 390.

Figure 20:
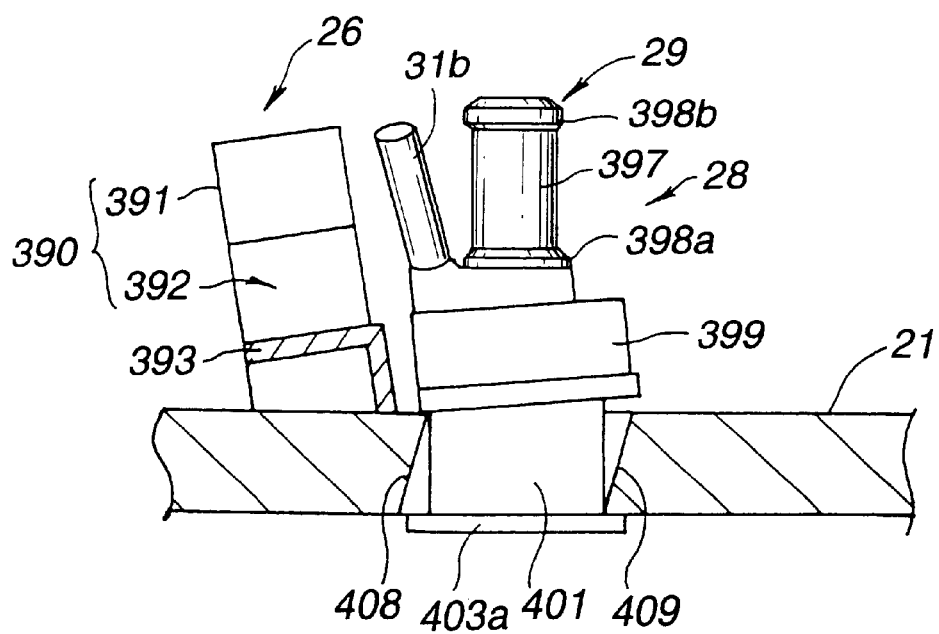
FIG. 20 is a cross-sectional side view showing a modification of the mechanism for tilting the second movable guide block.

In the above-described embodiment, the thrusting portion 396 is provided on the supporting base block 393 for tilting the second movement guide block 28 in a direction away from the rotary magnetic head device 26. Alternatively, the facing surfaces of the second movement guide groove 33 may be formed with inclined surfaces 408, 409, as shown in FIG. 20. These inclined surfaces 408, 409 are provided ahead and at back of the position of contact of the second inclined guide pin 31b with the tape guide drum 390 by movement of the second movement guide block 28 towards the rotary magnetic head device 26.

The inclined surfaces 408, 409 may also be provided only on one lateral side of the second movement guide groove 33.

In the tape recorder having the above-described rotary magnetic head device 26, the recording/reproducing unit for recording and/or reproducing information signals under controlling the running of the magnetic tape 7 and a running control mechanism for the magnetic tape 7 are explained.

Figure 21:
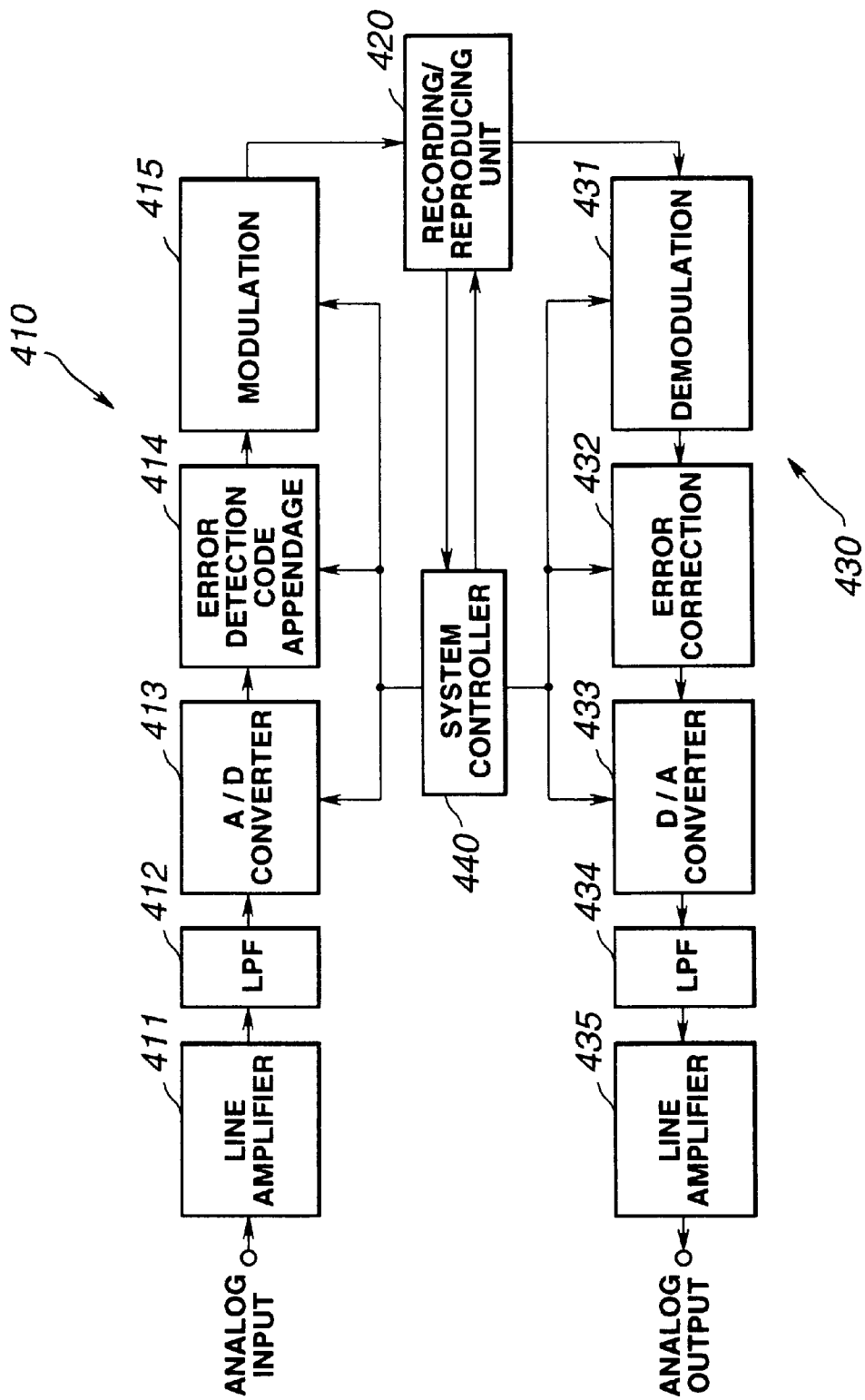
FIG. 21 is a block diagram showing a recording/reproducing system of the tape recorder according to the present invention.

Referring to FIG. 21, the tape recorder according to the present invention includes a recoding signal processing unit 410 for converting analog audio signals into digital signals for generating recording signals, and a recording/reproducing unit 420 for recording signals from the recoding signal processing unit 410 on the magnetic tape 7 by helical scan and for reproducing and outputting the signals recorded on the magnetic tape 7. The tape recorder according to the present invention also includes a reproduced signal processing unit 430 for converting the reproduced signals from the recording/reproducing unit 420 into output analog signals, and a system controller 440 for controlling the recording/reproducing unit 420 and the playback signal processing unit 430.

Referring to FIG. 21, the recording signal processing unit 410 includes an amplifier 411 for amplifying analog audio signals, a Low-Pass Filter (LPF) 412 for removing high frequency components of the amplified audio signals, an Analog/Digital (A/D) converter 413 for converting audio signals into audio data, an error detection code appendage circuit 414 for appending error correction codes and a modulator 415 for modulating the audio data in accordance with a modulation system suited for recording on the magnetic tape.

The amplifier 411 amplifies the input analog audio signals with pre-emphasis, if need be, to route the resulting signals to the LPF 412. The LPF 412 is a so-called pre-amplifier for removing frequency components not less than one-half the sampling frequency (such as 48 kHz) to route the resulting signal to the A/D converter 413. The A/D converter converts analog audio signals to, for example, 16-bit audio data.

The error detection code appendage circuit 414 interleaves audio data and encodes the interleaved data by double reed-Solomon code to route the resulting signals to the modulator 415, which then modulates the audio data, having the appended error detection correction codes, using e.g., 8–10 modulation system, and appends sub-codes and pilot signals for the Automatic Track Following (ATF) system to route the resulting recording signals to the recording/reproducing unit 420.

For recording signals in the present tape recorder, the recording mode is selected in order to execute tape loading of winding the magnetic tape 7 pulled out from the tape cassette 1 on the outer peripheral surface of the tape guide drum 26 of the rotary magnetic head device in a M-shape for an angular extent of approximately 160° and of enabling the running of the magnetic tape 7. By this tape loading, the pinch roll 62 is pressed against the capstan shaft 61 to clinch the magnetic tape 7 to run it at a constant speed in the forward direction from the supply side tape reel 5 towards the take-up side tape reel 6. At this time, the head driving motor 394 of the rotary magnetic head device 26 starts its operation to rotate the rotary drum 391 carrying the rotary magnetic head 26a.

The rotary magnetic head 26a is run in rotation at e.g., 2000 rpm. The capstan shaft 61 is run in rotation by the capstan motor 25 at an rpm corresponding to the pre-set tape running speed of e.g., 8.15 m/s. At this time, the supply side reel shaft 23 is enabled to be rotated so that the takeup side reel shaft 24 is run in rotation under the driving power of the capstan motor 25. The magnetic tape 7, pulled out from the supply side tape reel 5 and wound about the tape guide drum 390, is run at a pre-set speed so as to be taken up on the take-up side tape reel 6 of the tape cassette 1.

Figure 22:
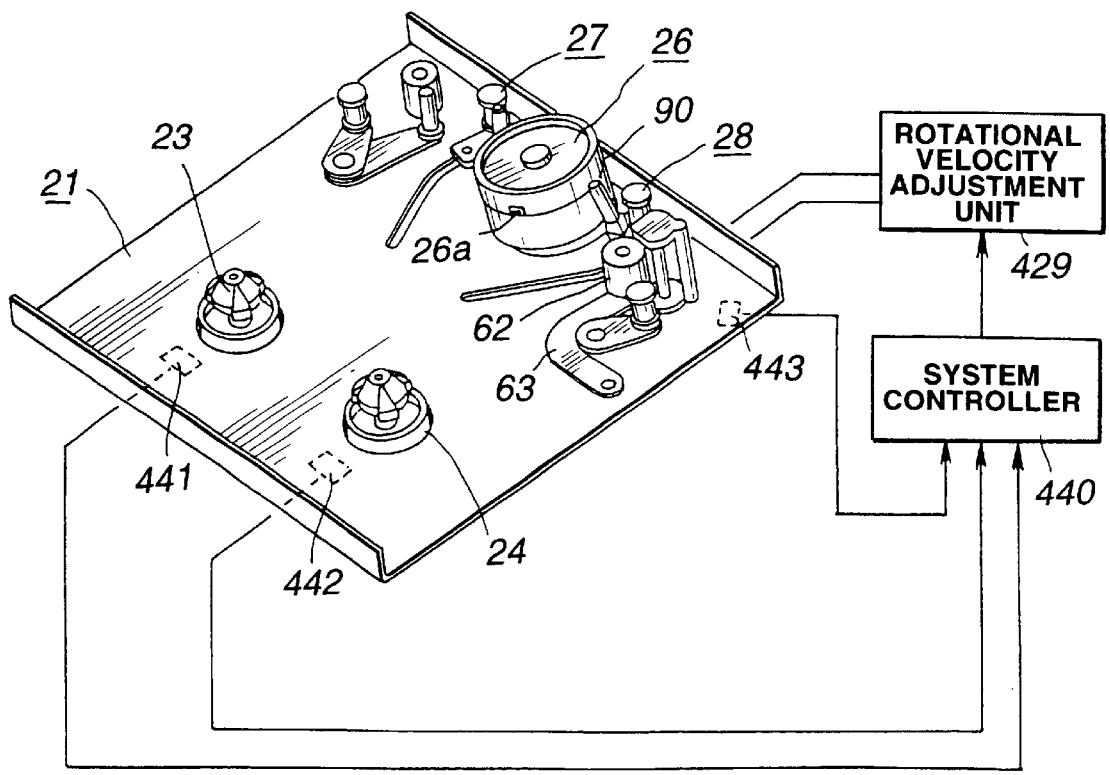
FIG. 22 is a perspective view showing a main mechanical portion for running the magnetic tape.

The tape recorder according to the present invention includes a rotary speed adjustment unit 429 for controlling the rotational speed of the capstan motor 25 for controlling the rotational speeds of the takeup side and supply side reel shafts 23, 24, as shown in FIG. 22. When applying braking to the supply side reel shaft 23, this rotary speed adjustment unit 429 controls the capstan motor 25 to control the rotation of the takeup side reel shaft 24 to a rotational sped suited to the winding diameter of the magnetic tape 7 wound on the takeup side tape reel 6.

In this state, the rotary magnetic head device 26 causes the rotary magnetic head 26a and the magnetic tape 7 to be slidingly contacted with each other in order to record the signals supplied from the modulator 415 on the magnetic tape 7 in accordance with the helical scan system. On the magnetic tape 7 is recorded an azimuth recording track on which signals are recorded in accordance with a pre-set format.

For reproducing the signals recorded on the magnetic tape 7, the reproducing mode is selected and, as in the above recording mode, the magnetic tape 7, pulled out from the tape cassette 1, is placed approximately 160° on the outer peripheral surface of the tape guide drum 26 in a M-shape by way of the loading. By this tape loading, the pinch roll 62 is pressed against the capstan shaft 61 to clinch and run the magnetic tape 7 in the forward direction from the supply side tape reel 5 towards the takeup side tape reel 6 at a constant speed. At this time, the head driving motor 394 of the rotary magnetic head device 26 starts its operation to rotate the rotary drum 391 carrying the rotary magnetic head 26a.

Although not shown, the tape recorder of the present invention has a track servo system by which the rotational speed of the capstan motor 25 is controlled based on ATF pilot signals recorded on the magnetic tape 56.

When applying braking to the supply side reel shaft 23, the takeup side reel shaft 25 is controlled by the rotary speed adjustment unit 429 to a rotational speed suited to the winding diameter of the magnetic tape 7 wound about the takeup side tape reel 6. The magnetic tape 7 is pulled out from the supply side tape reel 5 of the tape cassette 1 so as to be wound about the tape guide drum 390 of the rotary magnetic head 26 which is then run at a speed perpetually scanning the azimuth recording track before being rewound on the takeup side tape reel 6 of the tape cassette 1.

By the rotary magnetic head 26a scanning the azimuth recording track of the magnetic tape 7, the signals recorded on the magnetic tape 7 are reproduced as playback signals which are sent to the playback signal processing unit 430. Referring to FIG. 21, the tape recorder according to the present invention includes a demodulator 431 for demodulating playback signals from the playback signal processing unit 430, an error correction circuit 432 for correcting audio data from the demodulator 431 for errors, a D/A converter 433 and an LPF 434 for converting error-corrected audio data into analog audio signals and a line amplifier 35 for amplifying audio signals from the LPF 434.

The demodulator 431 is a counterpart of the modulator 415 of the recoding signal processing unit 410 and converts the playback signals supplied from the recording/reproducing unit 420 into binary signals while simultaneously demodulating the resulting binary-valued signals by inverse 8–10 modulation to route the reproduced audio data to the error correction circuit 432. The error correction circuit 432 corrects the audio data for errors, using Reed-Solomon codes, while deinterleaving and routing the error-corrected speech data to the D/A converter 433. The D/A converter 433 and the LPF 434 convert the speech data into analog audio signals. The amplifier 435 amplifies audio signals with de-emphasis and routes the resulting signals to, for example, an amplifier of a stereo device for reproducing signals recorded on the magnetic tape 7.

The mechanism for controlling rotation of the capstan motor 25 for controlling the running speed of the magnetic tape 7 and the rotational speeds of the supply side reel shaft 23 and the take-up side reel shaft 24 is explained.

The tape recorder according to the present invention includes sensors 441, 442, 443 for detecting the rotational speeds of the supply side reel shaft 23, capstan motor 25 and the take-up side reel shaft 24, as shown in FIG. 22. Thee sensors 441 to 443 are made up of, for example, Hall devices, which output FG signals to the system controller 440 as detection signals of frequencies proportionate to the rotational speeds of the respective shafts depending on the rotation of the magnetic material mounted on the supply side reel shaft 23, capstan shaft 61 as driving shaft of the capstan motor 25 and the take-up side reel shaft 24.

The system controller 440 outputs a rotational speed control signal controlling the rotational speed of the capstan motor 25 based on the frequency of the FG signal outputted by the sensors 441 to 443 to route the control signals to the rotary speed adjustment unit 429. The rotary speed adjustment unit 429 controls the rotational speed of the capstan motor 25 responsive to the rotational speed control signals outputted by the system controller 440. The system controller 440 perpetually detects which position of the entire length of the magnetic tape 7 is being scanned by the rotary magnetic head 26a, during running of the magnetic tape 7, based on the FG signals detected by the sensors 441 to 443. The system controller 440 calculates the winding diameter of the magnetic tape 7 wound about the supply side tape reel 5 and the takeup side tape reel 6.

Figure 23:
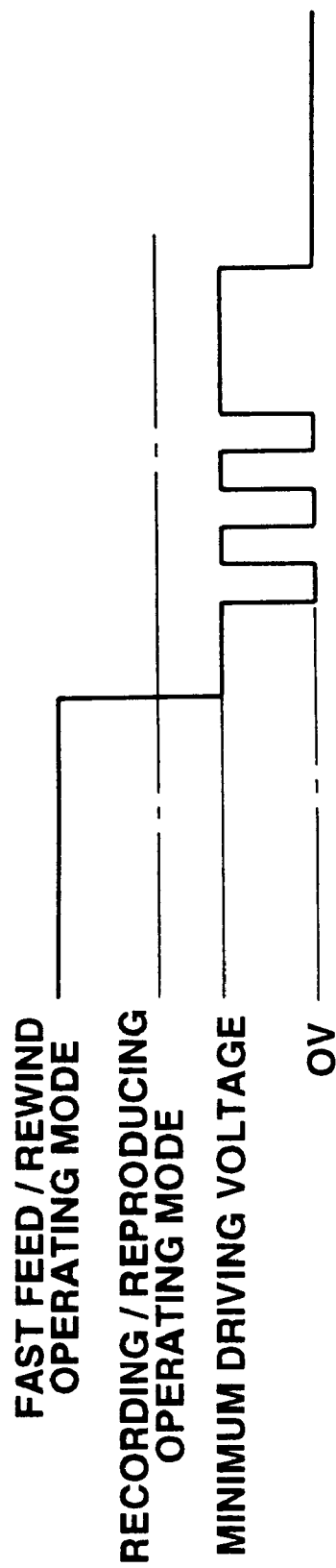
FIG. 23 is a waveform diagram showing a control PWM signal sent to a capstan motor used for running the magnetic tape.

During the recording mode or the playback mode of running the magnetic tape 7 in the forward direction, PWM signals of a pre-set wave crest value are supplied to the capstan motor 25 via rotary speed adjustment unit 429, as shown in FIG. 23. The PWM signals, supplied to the capstan motor 25, are controlled in duty based on the rotational speed control signal generated on the basis of the FG signals outputted by the sensors 441 to 443. The rotary speed adjustment unit 429 routes the PWM signals, controlled on the basis of the rotational speed control signal, to the capstan motor 25 to perform control to run the magnetic tape 7 at a constant speed.

If the fast feed mode or the fast search mode is selected, the system controller 440 sets the supply side tape reel 23 free in rotation, with the magnetic tape 7 wound about the rotary magnetic. head device 26. The system controller 440 also performs controls so that the head driving motor 394 rotationally driving the rotary drum 391 is run at a pre-set rotational speed, and so that the pinch roll 62 is spaced apart from the capstan shaft 61 to permit the magnetic tape 7 to run freely. The system controller 440 also controls the rotary speed adjustment unit 429 so that PWM signals having a wave crest values sufficiently higher than those during the recording mode or the reproducing mode will be supplied to the capstan motor 25 in order to permit the capstan motor 25 to be rotated at an elevated speed during the normal running direction, as shown in FIG. 23.

If the capstan motor 25 is rotated in the forward direction, the driving power transmission unit 152 is controlled to transmit the driving power of the capstan motor 25 to the takeup side reel shaft 24 so that the magnetic tape 7 is run at an elevated speed from the supply side tape reel 5 to the takeup side tape reel 6.

If the high-speed search mode is selected, the recording track is scanned by the rotary magnetic head 26a slidingly contacted with the magnetic tape 7 running at an elevated speed for searching e.g., the leading end of the unit information signal corresponding to a musical number recorded on the magnetic tape 7.

If the running of the magnetic tape, run at the elevated speed for the fast feed scanning mode or the high speed search mode, is halted, or the leading end address of the musical number being retrieved or the trailing end of the magnetic tape 7 is detected, the system controller 440 controls the rotary speed adjustment unit 429 so that the PWM signal of the wave crest value enabled at the minimum rpm of the capstan motor 25 will be sent to the capstan motor 25, as shown in FIG. 23. The system controller 440 then routes to the capstan motor 25 the control PWM signal having the duty corresponding to the winding diameter of the magnetic tape 7 placed on the supply side tape reel 5 as detected by the sensors 441 to 443 in order to apply braking to the capstan motor 25. Specifically, the system controller 440 routes to the capstan motor 25 via rotary speed adjustment unit 429 the control PWM signal of the period of 60 ms and the duty of 17% (that is 10 ms) corresponding to the winding diameter of the magnetic tape 7, placed on the supply side tape reel 5, as shown in FIG. 23. This starts the braking to the capstan motor 25. At this time, the system controller 440 monitors the rotational speed of the capstan motor 25, based on the FG signal supplied from the sensor 427. When the rotational speed of the capstan motor 25 is below a pre-set threshold value, that is if the rotational speed of the capstan motor 25 falls below a pre-set value, the supply of the control PWM signals to the capstan motor 25 is halted or the PWM signal corresponding to the minimum driving voltage of the capstan motor 25 is supplied to prevent loose winding of the magnetic tape 7 to enable tape takeup.

The above-given values of the period and duty of the control PWM signals are merely illustrative. These values are such values that the supply side tape reel 5, rotating by inertia when the rotation of the takeup side tape reel 6 is stopped, also ceases its rotation. This enables fast feed to be halted without producing the problem of loose winding of the magnetic tape 7 which occurred in the conventional rotary magnetic head type tape recorder at the time of tape stop.

Meanwhile, if the end of the magnetic tape 7 is detected, the control PWM signal with the duty of 100% is supplied until the halting of the capstan motor 25. That is, if the trailing end of the magnetic tape 7 is detected by tape end detection means not shown, there is no magnetic tape 7 on the supply side tape reel 5, so that there occurs no problem of tape slack in the magnetic tape 7.

The tape end detection means optically detects leader tape end portions provided on the leading and trailing ends of the magnetic tape 7 to detect tape ends to send the results of detection to the system controller 440.

The rewind mode for the magnetic tape 7 is basically the same as the above-described fast feed mode.

If the rewind mode is selected, the system controller 440 is responsive to the signals associated with this operating mode to set the takeup side reel shaft 24 free in rotation, with the magnetic tape 7 kept in the wound state in the rotary magnetic head device 26. The system controller 440 also performs control so that the head driving motor 394 for rotationally driving the rotary drum 391 will be rotated at a pre-set rotational speed. The system controller 440 also performs control so that the pinch roll 62 is separated from the capstan shaft 61 to permit free running of the magnetic tape 7 and so that the driving power of the capstan motor 25 will be directly transmitted to the supply side reel shaft 23. This enables the magnetic tape 7 to be run at a speed higher than the usual running seed for reproduction and taken up via the rotary magnetic head device 26 on the supply side tape reel 5.

If the halting operation is performed during the rewind operation of the magnetic tape 7, the control PWM signal, having the duty corresponding to the winding diameter of the magnetic tape 7 wound on the takeup side tape reel 6, calculated as described above, is sent from the system controller 440 to the capstan motor 25. At this time, the rotary speed adjustment unit 429 is switched by the system controller 440 so that the control PWM signal supplied to the capstan motor 25 is of a polarity such that the capstan motor 25 is rotated in the opposite direction to the direction of rotation during the rewind mode.

The system controller 440 monitors the rotational speed of the capstan motor 25, based on the FG signal from the sensor 427 and, when the rotational speed of the capstan motor 25 is below a pre-set value, the system controller 440 halts the supply of the control PWM signal to the capstan motor 25. This assures halting of the rewind mode without the problem of producing loose winding of the magnetic tape on the tape reel which occurred in the conventional rotary magnetic head system tape recorder at the time of halting of tape running.

In the above-described embodiment, the capstan motor is used without employing a dedicated driving motor for driving the supply side and takeup side reel shafts. However, the present invention may be applied to an embodiment in which the dedicated driving motors for driving the supply and takeup side reel shafts. In this case, it is the driving motor for driving the reel shaft that is controlled.

Although the above-described embodiment is applied to the tape recorder having the rotary magnetic head device, the present invention can be widely applied to recording and/or reproducing apparatus having the rotary magnetic head device and employing a magnetic tape as a recording medium, such as a video tape recorder for recording and/or reproducing video signals, with equivalent merits.

INDUSTRIAL APPLICABILITY

The above-described magnetic tape recording and/or reproducing apparatus according to the present invention has a switching mechanism having a counter gear which is positioned between the supply side reel gear and the takeup side reel gear during the loading operation of the magnetic tape by the tape loading mechanism. The counter gear of the switching mechanism is selectively engaged with the supply side reel gear or the takeup side reel gear after completion of loading of the magnetic tape in order to control the running direction of the magnetic tape. Thus, the running direction of the magnetic tape can be controlled only by switching of the counter gear to enable prompt switching of the running direction of the magnetic tape.

Moreover, with the magnetic tape recording and/or reproducing apparatus according to the present invention, one of paired movement guides of a tape pull-out mechanism movable between the position of pulling out the magnetic tape from the tape cassette loaded on the cassette loading unit and the position of winding the magnetic tape about the tape guide drum of the rotary magnetic head device is inclined in a direction away from the rotary magnetic head device. Thus, the movable guides can be moved closer to the rotary magnetic head unit arranged with a tilt thus reducing the separation between the paired movable guides and the size of the device to enable protection of the magnetic tape and the rotary magnetic head device.

Moreover, with the magnetic tape recording and/or reproducing according to the present invention, the control signal is supplied to enable the capstan motor responsible for tape running to be rotated in reverse at the time of decelerating or halting the magnetic tape from the state of running at a constant velocity. Thus, the magnetic tape can be prevented from running by inertia to enable magnetic tape to be taken up without producing tape slack.

What is claimed is:

1. A recording and/or reproducing apparatus for a magnetic tape of a tape cassette, comprising:

a supply side reel for reeling out the magnetic tape;

a takeup side reel for taking up the magnetic tape;

rotation detection means for detecting rotation of the supply side reel and the takeup side reel;

a running mechanism for running the magnetic tape at a constant speed, the running mechanism having a capstan and a capstan motor for rotationally driving the capstan and being adapted for running the magnetic tape at the constant speed; and control means for controlling the capstan motor based on results detected by the rotation detection means, wherein the control means supplies a control signal to the capstan motor until a period of a detection signal from the rotation detection means reaches a pre-set period so that the capstan motor is rotated in a reverse direction when a running speed of the magnetic tape is slowed by the running mechanism, generates a duty cycle of the control signal based on the rotation detection results of the supply side reel detected by the rotation detection means, routes the generated duty cycle to the capstan motor, calculates an amount of the magnetic tape wound around the supply side reel based on the rotation detection results detected by the rotation detection means and generates the control signal based on the calculated amount of tape, and wherein the control signal is a PWM signal and has a polarity for rotating the capstan motor in a reverse direction when rewinding the magnetic tape.

2. The recording and/or reproducing apparatus as recited in claim 1, wherein the control means halts supply of the control signal to the capstan motor when the period of the detection signal from the rotation detection means is not less than the pre-set period.

* * * * *